(12) United States Patent
Minamino

(10) Patent No.: US 7,620,239 B2
(45) Date of Patent: Nov. 17, 2009

(54) COLOR DETERMINATION DEVICE AND COLOR DETERMINATION METHOD

(75) Inventor: Katsushi Minamino, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 881 days.

(21) Appl. No.: 11/360,668

(22) Filed: Feb. 24, 2006

(65) Prior Publication Data

US 2006/0193513 A1 Aug. 31, 2006

(30) Foreign Application Priority Data

Feb. 28, 2005 (JP) ............................... 2005-053326

(51) Int. Cl.
*G06K 9/00* (2006.01)
(52) U.S. Cl. ...................... 382/165; 382/162; 382/167; 382/274; 382/302; 358/515; 358/518; 358/520
(58) Field of Classification Search ................. 382/162, 382/163, 164, 165, 166, 167, 274, 302; 358/514, 358/580, 515, 518, 520, 521; 348/453; 345/599–605
See application file for complete search history.

(56) References Cited

U.S. PATENT DOCUMENTS

| 4,623,973 | A | 11/1986 | Hoffrichter et al. |
| 5,420,704 | A | 5/1995 | Winkelman |
| 2002/0149799 | A1 * | 10/2002 | Hayashi ...................... 358/406 |
| 2004/0027594 | A1 * | 2/2004 | Suzuki et al. ................ 358/1.2 |
| 2004/0263879 | A1 * | 12/2004 | Ito et al. ...................... 358/1.9 |

FOREIGN PATENT DOCUMENTS

| GB | 2 413 024 A | 10/2005 |
| JP | 63-64479 | 3/1988 |
| JP | 2-137079 | 5/1990 |
| JP | 2003-259133 A | 9/2003 |

OTHER PUBLICATIONS

Japanese Notification of Reason(s) for Refusal dated Apr. 17, 2008, issued in corresponding Japanese Patent Application No. 2005-053326.
Great Britain's Search Report dated Apr. 21, 2006, issued in corresponding GB Application No. GB0603485.4.

* cited by examiner

*Primary Examiner*—Vikkram Bali
*Assistant Examiner*—Ali Bayat
(74) *Attorney, Agent, or Firm*—Westerman, Hattori, Daniels & Adrian, LLP

(57) ABSTRACT

A color determination device sections a hue plane, in which unit data constituting determining image data is mapped, into partial regions by a color determination boundary, and carries out a color determination according to a number of unit data belonging to each partial region. A gradient of a hue boundary line is a rational number. For example, an affine conversion or the like is executed on the hue plane, and the color determination boundary line is matched with an axis of the hue plane. Accordingly, a calculation amount is reduced in a determination processing for determining in which partial region the unit data belongs.

20 Claims, 25 Drawing Sheets

COLOR DETERMINATION DEVICE AND COLOR DETERMINATION METHOD

BACKGROUND OF THE INVENTION

1. Region of the Invention

The present invention relates to a device and a method capable of automatically determining a color of an image.

2. Description of the Related Art

A known image forming device reproduces an original image onto a printing medium such as paper. A color copy machine is one example of such an image forming device. The color copy machine can reproduce a scanned original image by full color. However, when the original image is expressed by a single-color color, it is inefficient for the color copy machine to operate engines of four colors, Yellow (Y), Magenta (M), Cyan (C) and black (K). If an image forming process can be carried out by using only a toner corresponding to a color component included in the original image, the image forming process can be carried out efficiently.

For such a purpose, the color of the original image is required to be determined. When a user carries out a color determination visually, a wrong determination may be made due to the subjectivity of the user. Even when the user determines the color correctly, the user is required to designate a hue by a key input operation or the like. Since such a key input operation is required, an inefficiency remains.

Due to such a circumstance, there exists a demand for an image forming device which includes a device for automatically determining a color of an original image.

Regarding an automatic determination of a hue, a known device includes a color identification circuit which determines the hue for a purpose of separating a color of a format part when an original image is read by an Optical Character Reader (OCR). The color identification circuit converts an image signal expressed by three color components of Red (R), Green (G) and Blue (B) into a color space of HSV (H=hue, S=saturation, V=luminance). Then, the color identification circuit compares a prescribed threshold value with a signal level, and determines the hue.

A known color separating device can separate colors without using a fixed threshold value. In a color separating process carried out by the color separating device, a color difference for each pixel is obtained from an image signal of three color components of RGB for each pixel. Then, according to a moving average, the color separating device clusters closely related colors among each pixel.

However, the known devices do not consider sufficiently about how to set a boundary, which is to be a standard for determining the color.

That is, the color identification circuit arranges a plurality of straight lines as color determination boundary lines in a color space (plane) defined by two color difference variables. However, the straight lines are defined just under a condition to distinguish a hue. A consideration beyond this extent is not made.

Therefore, a determination is required to be carried out as to a determining color belongs to a region located in which side of a color determination boundary line. Such a determination is carried out by calculating in which position and in which direction in the two-dimensional color space (color plane) a coordinate point of the determining color is located, and comparing a positional relation between the calculated position and the color determination boundary line. In such a calculation, a calculation for calculating in which direction from an origin a position to be determined is located becomes a complicated calculation since the calculation accompanies a calculation of an irrational number such as an inverse trigonometric function. As a result, the color determination is inefficient.

The above-described color separating device can carry out a color separation by using a moving average. At a stage when specifically determining the hue of the color separated as described above, the separated color is compared with a threshold value as a hue boundary. However, a particular improvement has not been made as to a selection and a comparison of the threshold value.

The above-described problems occur in the color copy machine and also in other machines such as a color facsimile machine. For example, in the color facsimile machine, the above-described problems occur when automatically determining by which color a received image will be printed in a single-color printing operation.

SUMMARY OF THE INVENTION

In order to overcome the problems described above, an advantage of the present invention is to provide a device and a method capable of reducing a calculation amount and automatically determining a color efficiently by improving a method for setting a color determination boundary line corresponding to a threshold value for a color determination.

According to an aspect of the present invention, a color determination device automatically determines a color of an image, and includes a region determination unit, a counting unit and a color determination unit. The region determination unit carries out a determination as to respective image data expressing a color of each portion of a determining image belongs to which one of a plurality of partial regions obtained by dividing a two-dimensional color plane by prescribed color determination boundary lines. The counting unit counts a result of the region determination of the region determination unit. The color determination unit determines a color of the determining image in accordance with a count result of the counting unit. In the color determination device, a gradient of the color determination boundary line with respect to a coordinate axis of the two-dimensional color plane is a rational number.

The color determination device also includes a conversion unit, which executes a prescribed conversion on the image data. The prescribed conversion includes a rotation on the two-dimensional color plane. After the prescribed conversion is executed on the image data, the region determination unit carries out a determination as to the which one of the plurality of the partial regions the image date belongs.

According to another aspect of the present invention, the prescribed conversion is an affine conversion in the two-dimensional color plane.

According to another aspect of the present invention, the prescribed conversion includes a rotational conversion for matching at least one of the color determination boundary lines with either one of coordinate axes in the two-dimensional color plane.

According to another aspect of the present invention, the color determination device also includes a selectively activating unit, which selectively activates the conversion unit according to which one of a plurality of types of three-dimensional color spaces a color of the determining image is expressed. The color determination device can execute a color determination of the image data based on the plurality of the region boundary lines in accordance with a common comparison standard regardless of which one of the plurality of types of the three-dimensional color spaces the determining image is expressed.

According to another aspect of the present invention, the prescribed conversion includes an anisotropic scaling in the two-dimensional color plane. The anisotropic scaling converts an absolute value of the gradient with respect to the coordinate axis for at least one of the plurality of the color determination boundary lines into 1.

According to another aspect of the present invention, the color determination device also includes an averaging unit, which averages pixel data in a pixel aggregate including adjacent pixels in the determining image and obtains the image data.

According to another aspect of the present invention, one coordinate axis of the three-dimensional color space in which the determining image is expressed is an achromatic axis.

According to another aspect of the present invention, the plurality of the partial regions include an achromatic region corresponding to an achromatic color, and the achromatic region includes an origin of the two-dimensional color plane.

According to another aspect of the present invention, the color determination unit includes a color/monochrome determination unit, which determines whether the determining image is a color image or a monochrome image in accordance with a number of data belonging to the achromatic region among the image data.

According to another aspect of the present invention, the counting unit includes an achromatic color counting unit and a chromatic color counting unit. The achromatic color counting unit counts a number of each determining image data belonging to a black color corresponding part in the achromatic region. The chromatic color counting unit counts a number of each image data belonging to each hue region for a plurality of hue regions corresponding to each of a plurality of hues among the plurality of the partial regions. The color/monochrome determination unit includes a color determination unit, which determines whether the determining image is a full color image, a single-color color image or a two-color color image in accordance with the count result of each of the achromatic color counting unit and the chromatic color counting unit.

According to another aspect of the present invention, the prescribed conversion includes a translation conversion in the two-dimensional color plane.

According to another aspect of the present invention, a color determination method for automatically determining a color of an image includes a region determining step, a counting step and a color determining step. In the region determining step, a determination is carried out as to respective image data expressing a color of each portion of a determining image belongs to which one of a plurality of partial regions obtained by dividing a two-dimensional color plane by prescribed color determination boundary lines. In the counting step, a region determination result of the region determining step is counted. In the color determining step, a color of the determining image is determined in accordance with the count result of the counting step. A gradient of the color determination boundary line with respect to a coordinate axis of the two-dimensional color plane is a rational number.

According to the above-described aspect of the present invention, the gradient of the color determination boundary line corresponding to a threshold value for the color determination is a rational number. Therefore, the calculation in the determination of the partial region does not accompany a calculation of an irrational number. As a result, a calculation amount for the determination can be reduced, and an automatic determination of the color can be carried out efficiently.

According to the above-described aspect of the present invention, at least one of the color determination boundary lines corresponding to the threshold value for the color determination matches with the coordinate axis of the two-dimensional color plane. Therefore, a part of the determination of the partial region can be carried out by a determination of a positive or a negative sign. As a result, the calculation amount for the determination can be reduced even more.

According to the above-described aspect of the present invention, by executing the rotational conversion, a common color determination boundary line can be used for the color determination of different three-dimensional color spaces. As a result, the color determination can be carried out efficiently.

According to the above-described aspect of the present invention, the absolute value of the gradient of at least one of the color determination boundary lines corresponding to the threshold value for the color determination is 1. Accordingly, a part of the determination of the partial region can be carried out by a determination of a size. As a result, the calculation amount for the determination can be reduced even more.

According to the above-described aspect of the present invention, the image data includes aggregate pixel data. Thus, the color determination device can carry out an automatic determination of a color that is not different from a determination of a color carried out when an original image is observed visually. The aggregate pixel data can be obtained from pixel aggregates including adjacent pixels.

According to the above-described aspect of the present invention, a color/monochrome determination can be carried out by using an achromatic region, which is one of the partial regions.

According to the above-described aspect of the present invention, by using the achromatic region and the hue region, which are the partial regions, a determination can be carried out as to the determining image is whether a full color, a single-color color or a two-color color.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS (1. Digital Color MFP 100) With reference to the drawings, a description will be made of preferred embodiments of the present invention.

Figure 1:
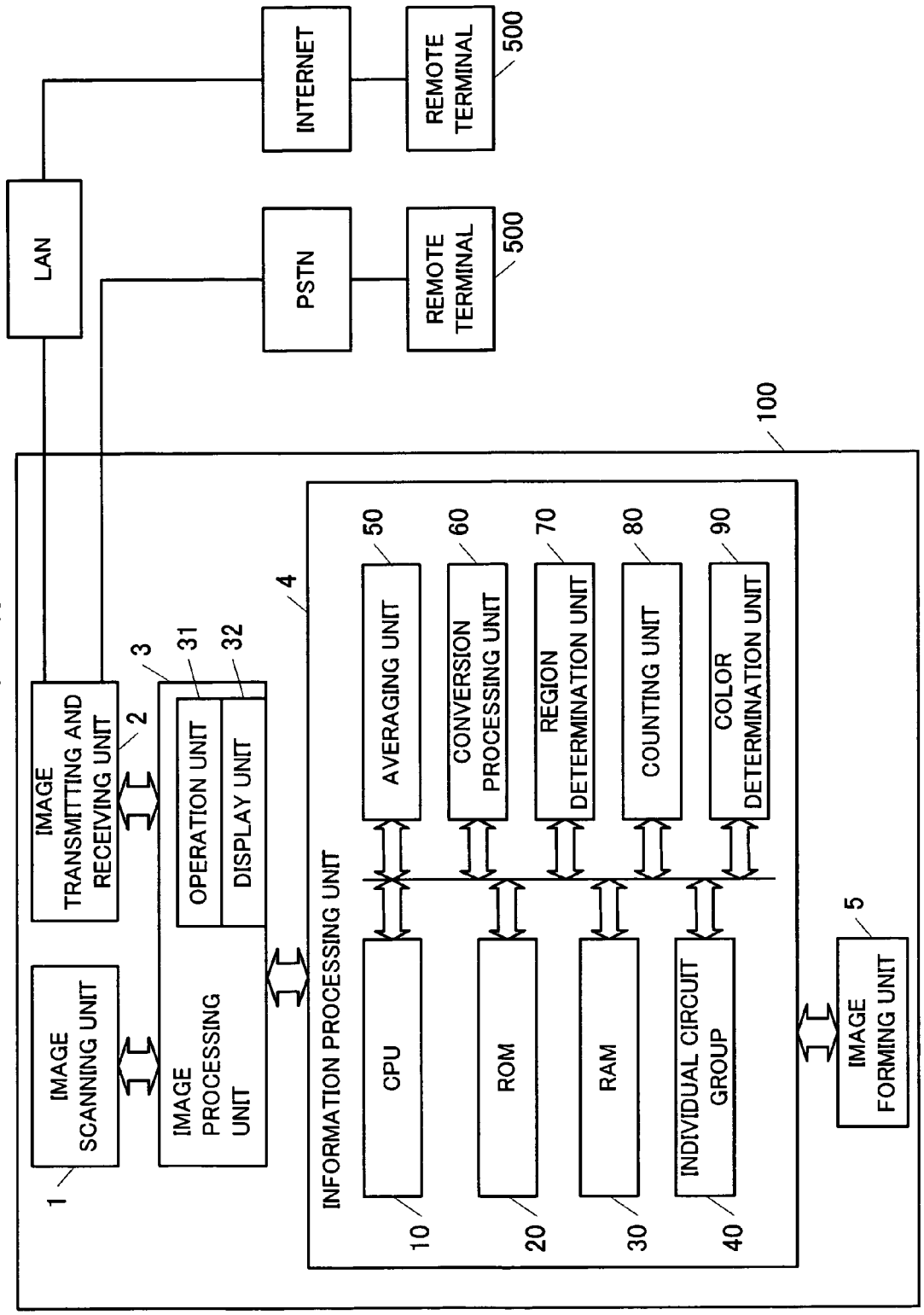
FIG. 1 is a view illustrating an example of a configuration of a digital color Multi Function Peripheral (MFP) including a function of a color determination device according to a preferred embodiment of the present invention.

FIG. 1 illustrates an example of a configuration of a digital color MFP 100 including a facsimile function and a copy function as an example of an image processing device including a function of a color determination device according to a preferred embodiment of the present invention. FIG. 1 illustrates functions particularly relating to the preferred embodiment.

The digital color MFP 100 includes an image scanning unit 1 and an image transmitting and receiving unit 2. The image scanning unit 1 includes a color scanner function or the like. The image transmitting and receiving unit 2 is used when transmitting and receiving image data between the digital color MFP 100 and a remote terminal 500. The image transmitting and receiving unit 2 includes a Network Control Unit (NCU) (not illustrated) and a Local Area Network InterFace (LAN I/F) (not illustrated). The NCU enables communication with the remote terminal 500 via a Public Switched Telephone Network (PSTN). The LAN I/F enables communication with the remote terminal 500 via a LAN and the Internet.

In addition, the digital color MFP 100 includes an image processing unit 3 which executes various image processing on image data. The image processing unit 3 includes an operation unit 31 and a display unit 32. A user can input a desired image processing from the image processing unit 3.

The digital color MFP 100 also includes an information processing unit 4 and an image forming unit (color printer unit) 5. The information processing unit 4 executes an information processing, which is to be a basis for executing various operations such as a selection of an operation mode for carrying out an image forming process. The image forming unit 5 executes the image forming process under the selected operation mode. The image forming unit 5 includes a cartridge which accommodates colorants (for example, toner) of four colors: Cyan (C), Magenta (M), Yellow (Y) and blacK (K). The image forming unit 5 executes a printing process onto a paper medium or other sheet by a laser electrophotographic method using the colorants. A function and a structure of the information processing unit 4 will be described hereinafter. Each of the functional components of the digital color MFP 100 is connected to one another via an inner communication unit, such as a bus.

The above description relates to a configuration example in which the color determination device according to a preferred embodiment of the present invention is applied to the digital color MFP 100 including the facsimile function and the copy function.

Next, a description will be made of an outline of an operation in which the digital color MFP 100 records and reproduces an original image onto a paper medium such as plain paper.

First, the digital color MFP 100 obtains digital image data of an image to be an original document. This original document may be either a monochrome original document or a color original document. The digital image data of the image to be the original document may be obtained by the following two methods. A first method is a method for obtaining original image data from the image scanning unit 1. For example, the image scanning unit 1 executes a scanning process of an original image by a full color Flat Bed Scanner (FBS) per each pixel. Accordingly, the image data of the original image is obtained for each color component of Red (R), Green (G) and Blue (B). The obtained image data of the original image, specifically, an RGB signal for each pixel output from a Charge-Coupled Device (CCD) of the FBS, will hereinafter be referred to as RGB image data.

A second method is a method for receiving original image data from the image transmitting and receiving unit 2. For example, the image transmitting and receiving unit 2 obtains the image data of the original image from the remote terminal 500, which is connected to the digital color MFP 100 via the Internet, by electronic mail communication. The obtained image data is compressed by the Joint Photographic Experts Group (JPEG) method, for example, and a color expression of the image data is a color method having a YCC color space (hereinafter referred to as "Ycc image data").

Next, the image processing unit 3 executes an image processing, such as a color adjustment, on the original image data. First, a description will be made of an image processing carried out when RGB image data is input. When RGB image data is input to the image processing unit 3, a prescribed correction process for an RGB signal, such as a shading correction and a gamma correction, is executed on the RGB image data. Next, the RGB image data is converted by a matrix operation from an expression by the RGB color space into an expression by a prescribed color space. Further, the prescribed color space is a color space, such as a Lab color space and a Ycc color space, which includes one achromatic axis in a three-dimensional space. In the preferred embodiment, it is assumed that the RGB image data is converted into an expression by the Lab color space (hereinafter referred to as "Lab image data").

An image processing carried out when the Ycc image data is input is the same as an image processing carried out on the Lab image data to be described hereinafter. Further, with respect to the Ycc image data, in the same manner as the RGB image data, after Ycc image data is converted into an expression by the Lab color space, the following process can be carried out. An interconversion of the color space can be carried out by an affine conversion or the like.

Next, an image processing, such as a scaling process and a color adjustment process, is executed on the Lab image data.

The image processing is executed in accordance with an image adjustment instruction input from the operation unit 31 by the user. For example, when an image adjustment instruction is input from the operation unit 31 to greatly brighten a reproduction image to be reproduced on a paper medium compared with the original image, an image processing, such as an enlargement and a color adjustment, is executed on image data of the original image.

In the preferred embodiment, a color adjustment using a Lab color space can be executed on the Lab image data, and a color adjustment using a Ycc color space can be executed on the Ycc image data. However, as described above, after the Ycc image data is converted into an expressed by the Lab color space, a color adjustment can be carried out.

Meanwhile, in the information processing unit 4, a color determination of the original image data is carried out by a method described hereinafter. In the preferred embodiment, the information processing unit 4 particularly includes a color/monochrome determination program among various color determinations. That is, a determination is carried out as to whether the original image data is a monochrome image or a color image. When the original image data is a color image, a determination is carried out as to whether the original image data is a full color image, a single-color color image or a two-color color image. A determination result is output to the image forming unit 5.

After the image forming unit 5 receives the determination result from the information processing unit 4, the image forming unit 5 starts an image forming mode according to the determination result.

In the preferred embodiment, the image forming unit 5 includes four operation modes. The four operation modes include (1) a monochrome print mode for forming a monochrome image; (2) a full color print mode for forming a color image, particularly, a full color image; (3) a single-color color print mode for forming a color image, particularly, a single-color color image; and (4) a two-color color print mode for forming a color image, particularly, a two-color color image. Further, in the present preferred embodiment, print colors capable of being selected in the single-color color print mode P3 and the two-color color print mode P4 are six colors: Cyan (C), Magenta (M), Yellow (Y), Red (R), Green (G) and Blue (B).

In the image forming unit 5, the processed original image data is converted into a digital signal of each color component of Cyan (C), Magenta (M), Yellow (Y) and blacK (K) by using a three-dimensional lookup table and an interpolation calculation (hereinafter referred to as "CMYK image data"). The input image data may be Lab image data by the Lab color space or Ycc image data by the Ycc color space. Thus, a Read Only Memory (ROM) (not illustrated) or the like stores a three-dimensional lookup table for each color space.

A binarization process is executed on the CMYK image data for each of the color components CMYK by using a dither method, an error diffusion method or the like.

The processed CMYK image data is respectively output to image forming engines of CMYK in the image forming unit 5 and printed out onto a paper medium by the designated operation mode (print mode).

The above-description is a summary of the operation carried out by the digital color MFP 100 for reproducing an original image onto a paper medium according to the preferred embodiment of the present invention.

(2. Information Processing Unit 4) Next, a description will be made of the information processing unit 4. In the present preferred embodiment, the digital color MFP 100 includes the information processing unit 4. However, the information processing unit 4 may be provided in another device and used for various color determinations other than the monochrome/color determination.

With reference to FIG. 1, a description will be made of an example of a configuration of the information processing unit 4. A Central Processing Unit (CPU) 10 controls the information processing unit 4 in accordance with a prescribed program. A ROM 20 stores the prescribed program. A Random Access Memory (RAM) 30 temporarily stores image data, a counted value, or the like. The information processing unit 4 also includes an individual circuit group 40 which can realize various functions described hereinafter.

The information processing unit 4 also includes an averaging unit 50, a conversion processing unit 60, a region determination unit 70, a counting unit 80 and a color determination unit 90. The averaging unit 50 carries out an averaging process described hereinafter. The conversion processing unit 60 carries out various conversion processes on image data. The region determination unit 70 carries out a determination as to unit data described hereinafter belongs to which partial region of a hue plane described hereinafter. The counting unit 80 counts a number of unit data belonging to each partial region. The color determination unit 90 carries out a color determination of input image data after receiving a count result from the counting unit 80. Each of the units is connected to one another via a bus to form the information processing unit 4.

Figure 2:
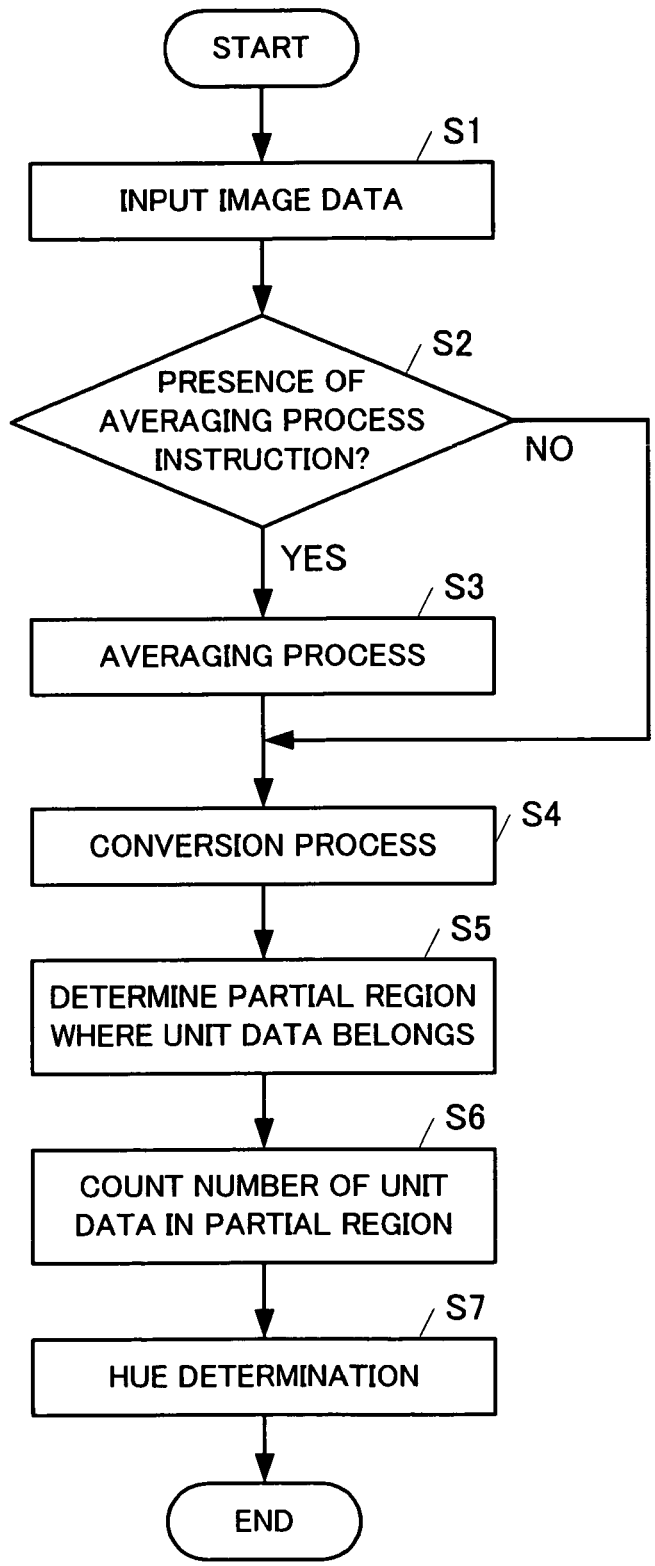
FIG. 2 is a flowchart illustrating a processing operation of an information processing unit.

Next, with reference to the flowchart of FIG. 2, a description will be made of a processing operation of the information processing unit 4. First, Lab image data or Ycc image data, which has been executed with various image processing by the image processing unit 3, (hereinafter referred to as "image data D1") is loaded (step S1). The loaded image data D1 is stored once in the RAM 30.

In the present preferred embodiment, the input image data D1 includes a three-dimensional color space of either the Lab color space or the Ycc color space. The input image data D1 may be other data by various three-dimensional color spaces including an achromatic axis. For example, the information processing unit 4 can handle image data by a three-dimensional color space such as XYZ, YIQ and Luv.

In this specification, two components in the three-dimensional color space (a chromaticity component in a Lab color space and a color difference component in a Ycc color space) excluding components of an achromatic axis (a lightness component in the Lab color space and a luminance component in a Ycc color space), that is, two parameters relating to the hue, will generally be referred to as a "hue parameter". A two-dimensional color plane defined by the hue parameter will be referred to as a "hue plane".

Next, in accordance with a type of the image data D1 loaded at step S1, a determination is carried out as to whether or not an averaging process is necessary to be executed on the image data D1 (step S2). An averaging process instruction may be programmed in the ROM 20 so that the averaging process instruction is generated automatically with a resolution or the like of the image data as a standard. Alternatively, the instruction may be input from the operation unit 31 by the user.

When the image data D1 is a type with an averaging process instruction, the averaging unit 50 executes the averaging process (step S3).

The averaging process is not necessarily required to be executed on all types of image data D1. When a determination is made that an averaging process is not required to be executed on the input image data D1 (step S2), the process proceeds onto step S4 without executing the averaging process.

A description will be made of a specific averaging process operation. The averaging process is a process for obtaining raw pixel data D2 including color information for each pixel aggregate from the image data D1 including color information for each pixel.

Figure 3:
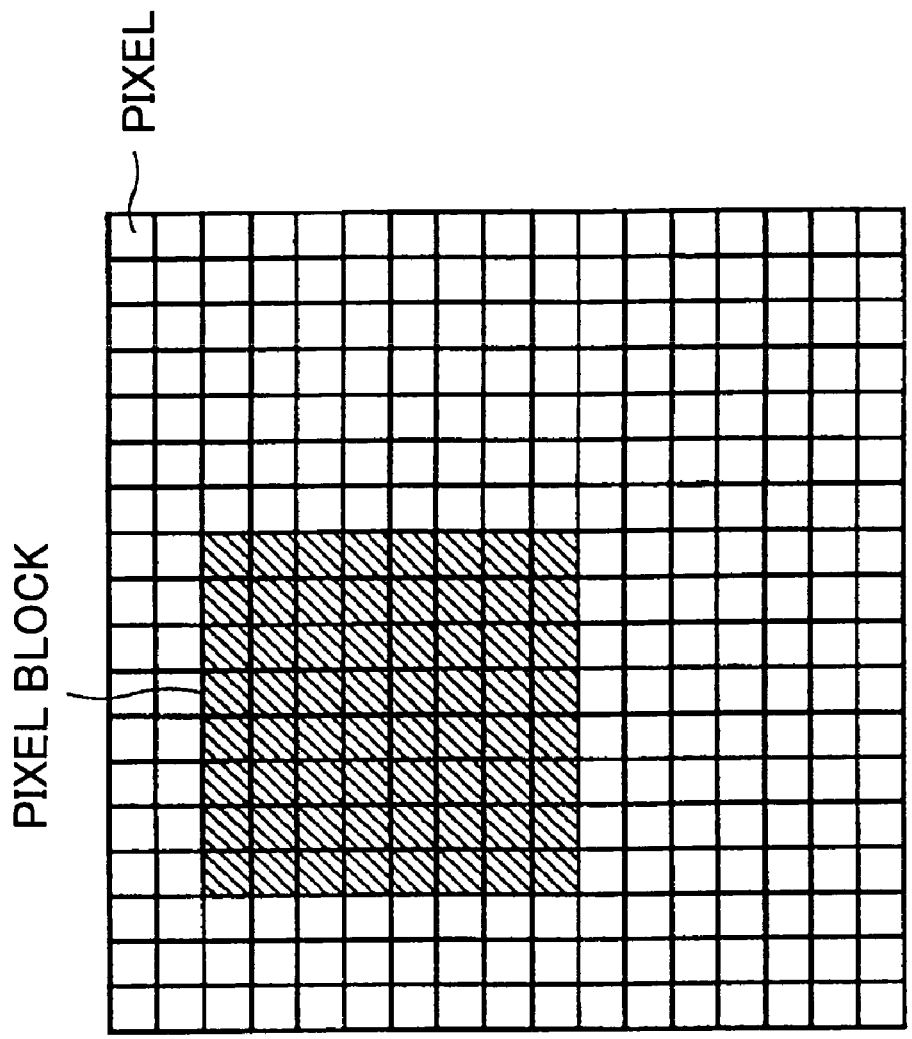
FIG. 3 is a view illustrating a pixel block.

Specifically, pixel data of the image data D1 is sectioned into each pixel block (for example, a pixel cluster arranged in a matrix including eight pixels in height and width, respectively (refer to FIG. 3)) including a plurality of adjacent pixels, and a pixel aggregate including all pixels (8×8=64 pixels) included in each block is defined. The pixel aggregate may be defined for only pixel data within a sampling region, which is a specific region in an image, instead of for all pixel data of the image data D1.

Further, the pixel block is not limited to the above-described example. A shape and a number of pixels of the pixel block may be defined arbitrarily. In particular, a size of the pixel block is preferably changed according to a resolution of an image to be processed (a scanned image or an output image). Furthermore, a shape and a size of the pixel block may be changed according to a relative position in the entire image.

Next, in each pixel aggregate, a data value of pixels of the pixel aggregate is averaged for each component (in case of Lab image data, for an L component, an a component and a b component). The averaged value of each component is the data value of the pixel aggregate. That is, the data value of all pixel aggregates defined in the pixel data is obtained as unit data expressing a color of a unit region corresponding to a pixel aggregate.

The above description relates to the averaging process (step S3) carried out by the averaging unit 50. The data including a value of all unit data, which is a data value of all pixel aggregates, will hereinafter be referred to as "raw image data Da". In case of not carrying out such an averaging process, an individual pixel is a unit region, and color data of an individual pixel is unit data.

A color recognized visually may differ from a color recognized by a minute unit, i.e., by a pixel. Compared with the image data D1 before the averaging process, the raw image data Da obtained by the averaging process is in a color expression close to a color feature felt when an image is observed visually. Therefore, when a color determination is carried out by using raw pixel data, a color determination closer to a visual sense can be carried out.

Referring to FIG. 2 again, a description will be continued. The image data, which has proceeded onto step S4 via step S2 and step S3 (the raw image data Da executed with the averaging process), and the image data, which has proceeded onto step S4 via step S2 and not step S3 (the image data D1 not executed with the averaging process), will be referred to as "converting image data D2".

Next, the conversion processing unit 60 executes a conversion process according to a type of the converting image data D2 (step S4).

The ROM 20 previously stores a procedure of various conversion processes according to a type of input converting image data D2. When a plurality of types of converting image data D2 may be input, the ROM 20 stores a plurality of types of conversion processes.

The unit data, which is a constituent element of the converting image data D2, (i.e., pixel data of the image data D1 not executed with the averaging process, pixel aggregate data in the raw image data D1) includes three components defined from each axis of the three-dimensional color space by the Lab or the Ycc. A hue plane by the Lab or the Ycc (a hue plane before the conversion process will hereinafter be referred to as a "hue plane H0") is converted into various hue planes by the conversion process. Further, the conversion process will be described in a more detail later.

The converting image data D2 executed with the conversion process or the like will hereinafter be referred to as "determining image data D3". Further, there is a case in which no conversion process is executed. In such a case, the determining image data D3 is the converting image data D2.

Further, the averaging process (step S3) may be carried out before the conversion process (step S4), or the conversion process (step S4) may be carried out before the averaging process (step S3). When carrying out the conversion process first, an averaging process is carried out on the input image data D1, which has been executed with the conversion process.

Next, the region determination unit 70 carries out a determination as to each unit data belongs to which partial region (step S5).

A hue plane (for example, H01 of FIG. 4) in the determining image data D3 is sectioned into a plurality of partial regions (for example, mC, mM, ... mR) according to a hue or a saturation by a prescribed color determination boundary line. Further, a unique color determination boundary line (for example, d01 of FIG. 4) is set in each of hue planes obtained from various conversion processes. The ROM 20 previously stores the unique color determination boundary line. Further, the color determination boundary will be described in detail later.

At step S5, the region determination unit 70 determines as to the unit data belongs to which one of the partial regions. Further, a specific process of a determination operation is carried out in accordance with the color determination boundary line. When a labeling of the partial region to which the unit data belongs has been completed for all unit data, the process proceeds onto step S6.

Next, the counting unit 80 counts a number of unit data belonging to each partial region (step S6). Further, a prescribed threshold value may be provided for each partial region, and a determination may be carried out as to whether or not a number of image data belonging to each partial region exceeds a prescribed number.

Next, the color determination unit 90 carries out a color determination of an image from the count result obtained at step S6 (step S7). The color determination is carried out according to various purposes. For example, in the digital color MFP 100, a color/monochrome determination is carried out according to a purpose for selecting an appropriate mode from various image forming modes of the image forming unit 5 and operating the selected mode.

Further, the sectioning and the determining processes of the region determination unit 70 and the counting process of the counting unit 80 may be carried out as one operation. That is, in this case, the counting unit 80 directly carries out a determination as to each unit data belongs to which partial region and carries out the counting process based on the determination result. The above description relates to the processing operation of the information processing unit 4.

(3. Conversion Process) Next, the conversion process (step S4 of FIG. 2) will be described in a more detail. The conversion process is a process for converting the hue plane H0 (two-dimensional color plane) of the three-dimensional color space (Lab or Ycc) of the converting image data D2 into various hue planes. An outline of such a conversion process will be described with reference to the drawings of specific examples described in detail hereinafter.

In the preferred embodiment of the present invention, the color determination boundary line includes a rational gradient with respect to a coordinate axis in the two-dimensional color plane. Therefore, for example, in a hue plane (FIG. 7) of the Lab color space, when a gradient of hue boundary lines d02 with respect to a coordinate axis is an irrational number, hue boundaries d3 are preset and used in place of the hue boundary lines d02. Further, the hue boundary lines d3 are closest to the hue boundary lines d02, and a gradient of the hue boundary lines d3 with respect to the coordinate axis is a rational number.

A straight line having a gradient of a rational number "A/B" (A is an integer and B is a natural number) with respect to one of the coordinate axes (for example, a coordinate axis a3 corresponding to an a component in the Lab color space) has a gradient "B/A" with respect to the other coordinate axis (a coordinate axis b3 corresponding to a b component). "B/A" is also a rational number. Therefore, when the gradient of the straight line with respect to one of the coordinate axes is rationalized, the gradient of the straight line is rationalized with respect to both of the coordinate axes as a result.

Meanwhile, instead of just slightly displacing the color determination boundary lines and carrying out a rationalization as described above, to simplify the color determination even more, while following a condition that the gradient with respect to the coordinate axis is a rational number, the color determination boundary line may be changed to a new position. Then, a conversion process according to the change may be executed on image data, and a comparison of the color determination boundary line and the image data may be carried out. The conversion and the comparison of the color determination boundary line to be a comparison standard and the image data to be compared (in the present preferred embodiment, unit data) have different effects from an aspect of "numeric value", although the comparison may be mathematically (i.e. in terms of formula) equivalent to before applying such a change.

That is, in case a standard number in the comparison process is an irrational number, and in case a standard number in the comparison process is a rational number, in terms of a digital processing, the former involves a complicated calculation with a large number of digits and is prone to include an error while the latter involves a simple calculation and includes a small error.

A description will be made of various processing operations for reducing a calculation amount in the determination by executing a processing for changing the gradient of the color determination boundary line into a rational number (hereinafter a "rationalization conversion").

For example, the conversion process is an affine conversion. As well known, the affine conversion is defined as a homogeneous or nonhomogeneous primary conversion including a coordinate conversion such as translation, a rotation, an enlargement or a reduction (a scaling conversion), a reflection and a shear.

In the present preferred embodiment, various conversion processes according to each converting image data D2 are set. Each conversion process primarily includes a combination of the following three conversion processing elements: "rotation", "enlargement or reduction" and "translation". Before describing the specific conversion process according to specific converting image data D2, a description will be made individually of each of the three conversion processing elements.

(3-0. Setting of Color Determination Boundary Line d0) Before describing the three conversion processing elements, a description will be made of the color determination boundary line d0 in the hue plane H0 before the conversion. The color determination boundary line sections the hue plane into prescribed partial regions. According to whether the boundary is a boundary of a chromatic color plane or a boundary between a chromatic color and an achromatic color, the boundary is briefly classified into a hue boundary and a saturation boundary.

Figure 4:
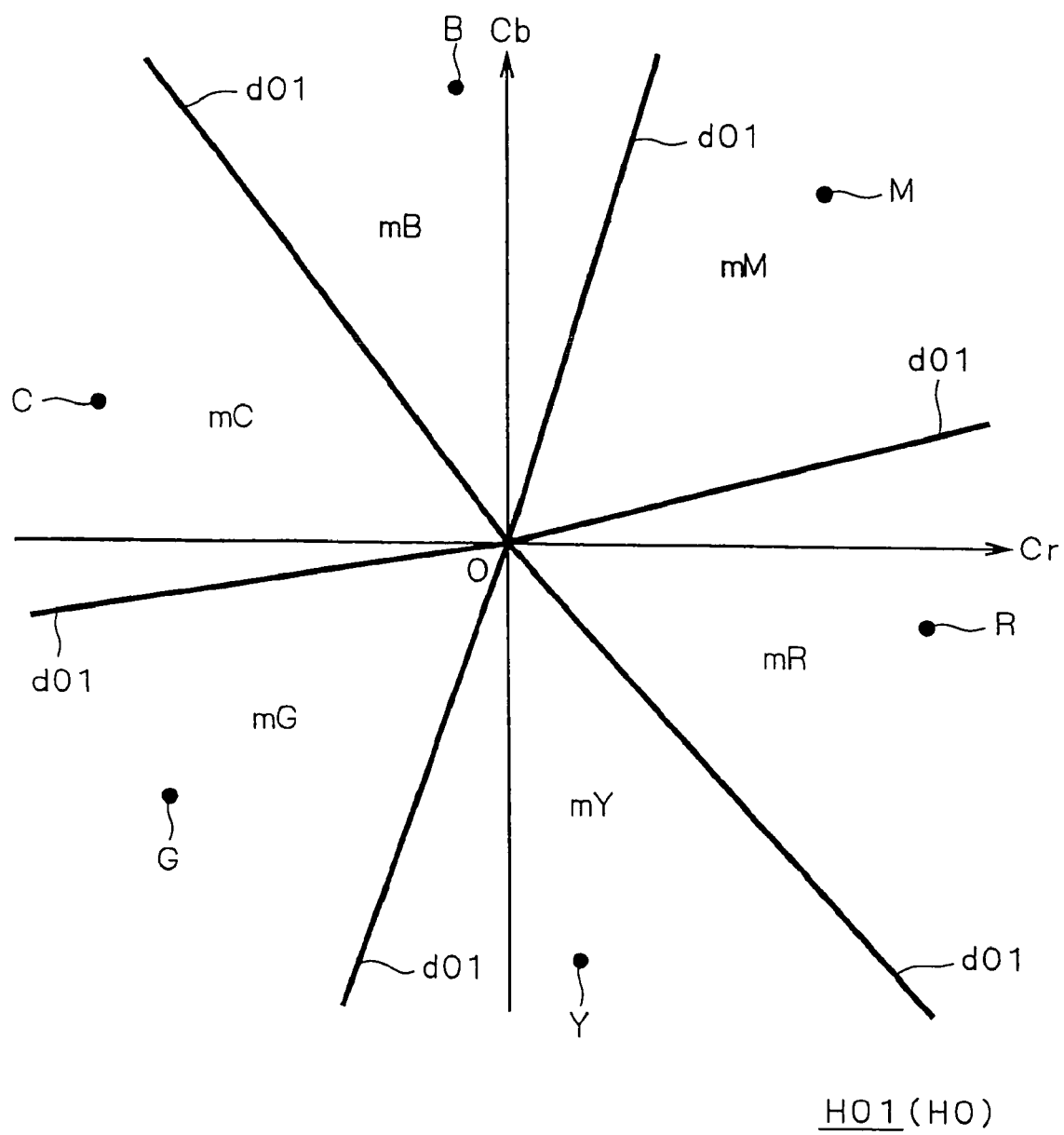
FIG. 4 is a view illustrating a hue plane H01 in a Ycc color space.
Figure 5:
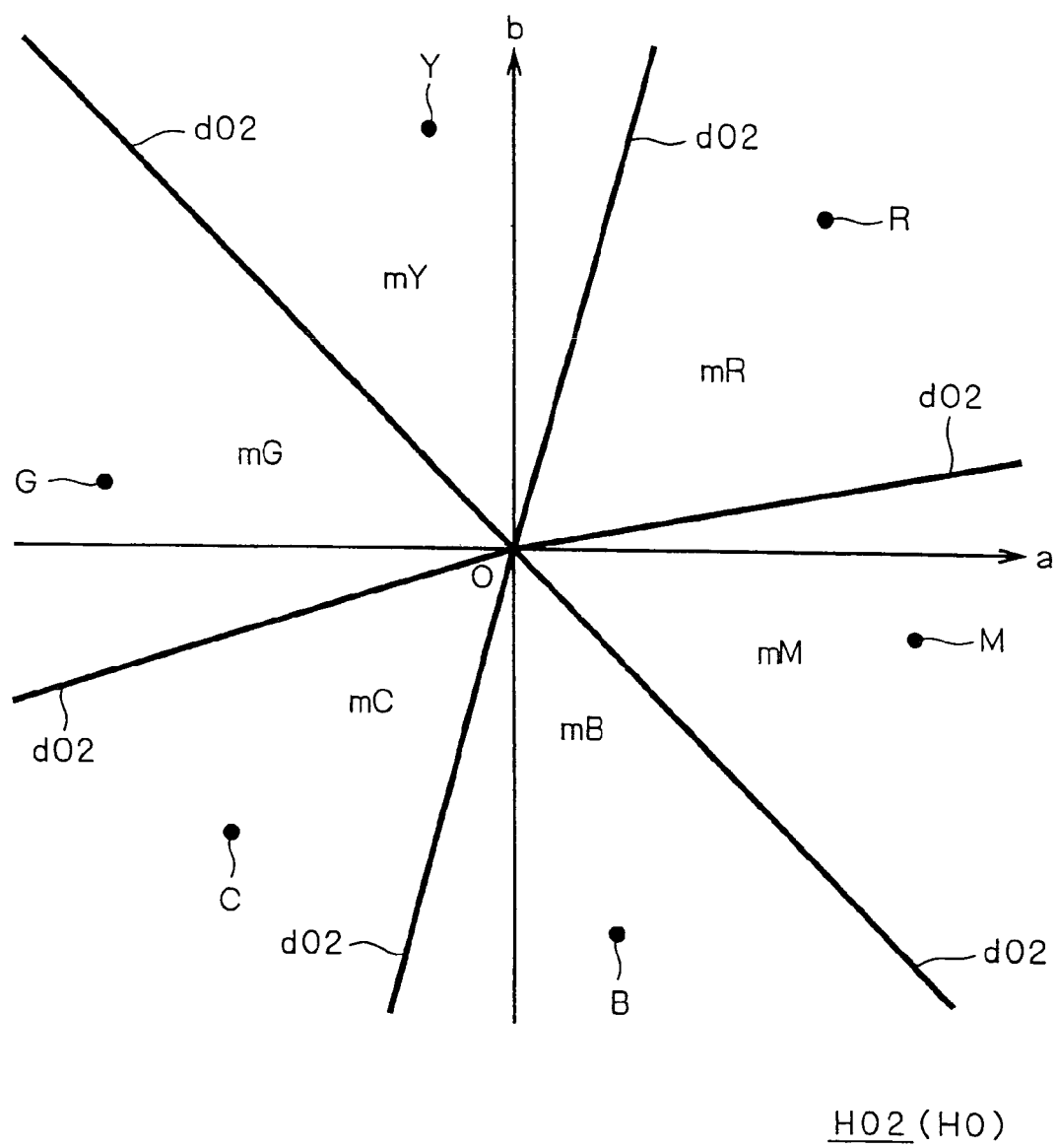
FIG. 5 is a view illustrating a hue plane H02 in a Lab color space.

(Setting of Hue Boundary) FIG. 4 and FIG. 5 illustrate the hue plane H0 before the conversion process. FIG. 4 illustrates a hue plane H0 in a Ycc color space. FIG. 5 illustrates a hue plane H02 in a Lab color space. For example, a hue H (M) of a point M (Mr, Mb) on the hue plane H01 of FIG. 4 can be expressed by the following formula 1:

$$H(M) = \tan^{-1}\left(\frac{Mb}{Mr}\right) \quad \text{[Formula 1]}$$

In accordance with a general feature of the hue plane H0, the hue plane can be divided and sectioned into a plurality of partial regions according to each hue.

For example, as in the present preferred embodiment, in case of the information processing unit 4 of the digital color MFP 100, a color determination according to a print color, which can be selected in a print mode of the image forming unit 5, becomes necessary. Therefore, the color determination boundary line as the hue boundary line defines the partial region corresponding to each print color. FIG. 4 and FIG. 5 illustrate an example of the hue plane H0 sectioned into partial regions mC, mB, mM, mR, mY and mG corresponding to six hues of Cyan (C), Blue (B), Magenta (M), Red (R), Yellow (Y) and Green (G). In the following, a region located closer to an origin among the partial regions defined from the saturation boundary line (for example, mK of FIG. 16) will be referred to as an achromatic partial region mK. The regions other than the achromatic partial region mK, i.e., the partial regions defined from the hue boundary line in the chromatic region (for example, mC through mG of FIG. 4) will be collectively referred to as a "hue partial region". The hue region is a partial region to be a basis for determining a difference of hues in a chromatic color. Further, an actual position of the hue determination boundary line d0 is defined individually according to color or the like of each toner. In FIG. 4 and FIG. 5, the hue boundary lines are defined so that coordinate positions of representative points C, B, M, R, Y and G defined in the hue plane are located at the center of the respective hue partial region.

As another example, in the information processing unit 4, when distinguishing a specific "bluish red" color from the hue partial region generally recognized as "red", a hue boundary line defining the region of "bluish red" to be distinguished is set on the hue plane H01.

Figure 16:
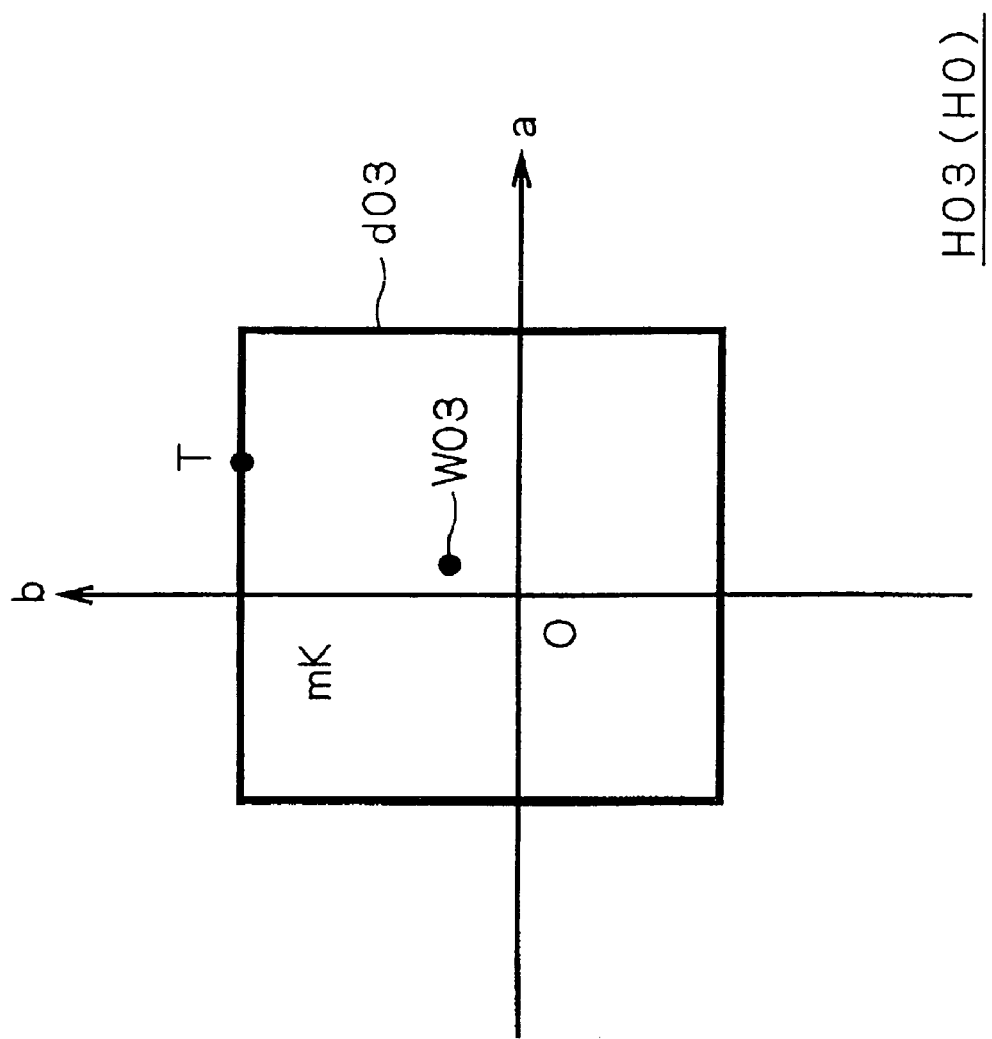
FIG. 16 is a view illustrating a hue plane H03 in a Lab color space.

(Setting of Saturation Boundary Line) FIG. 16 illustrates a hue plane H0 in a Lab color space before the conversion process. A saturation C (T) of a point T (Ta, Tb) on a hue plane H03 can be expressed by the following formula:

$$C(T) = \sqrt{Ta^2 + Tb^2} \quad \text{[Formula 2]}$$

That is, the saturation becomes lower as the point is located closer to the origin. By following such a general feature of the hue plane, a saturation boundary line can be set on the hue plane. An achromatic region mK is defined by the saturation boundary line.

For example, in case of the information processing unit 4 arranged in the digital color MFP 100 as in the present preferred embodiment, the saturation boundary line that defines the achromatic partial region mK corresponds to a threshold value w for determining whether data is an achromatic color (white or black) or a chromatic color (color). FIG. 16 illustrates an example of a saturation boundary line d03 in the hue plane H03. Further, an actual position of the saturation boundary line is defined individually according to a model of each machine.

(3-1. First Conversion Processing Element) A first conversion processing element is a rotational conversion. The rotational conversion with respect to a two-dimensional plane can be generally expressed by the following formula:

$$\begin{pmatrix} X_2 \\ Y_2 \end{pmatrix} = \begin{pmatrix} \cos\theta & -\sin\theta \\ \sin\theta & \cos\theta \end{pmatrix} \begin{pmatrix} X_1 \\ Y_1 \end{pmatrix}$$ [Formula 3]

A parameter θ is a rotational angle and set according to a position of the hue determination boundary line.

When the hue determination boundary line is a straight line passing through the origin in the hue plane, by executing a rotational conversion on the hue plane, a hue determination boundary line having an arbitrary gradient can be obtained.

(3-2. Second Conversion Processing Element) A second conversion processing element is an enlargement or a reduction conversion (scaling). The scaling with respect to a two-dimensional plane can be generally expressed by the following formula:

$$\begin{pmatrix} X_2 \\ Y_2 \end{pmatrix} = \begin{pmatrix} kx & 0 \\ 0 & ky \end{pmatrix} \begin{pmatrix} X_1 \\ Y_1 \end{pmatrix}$$ [Formula 4]

A parameter k is a coefficient of the scaling and set according to a position of the color determination boundary line.

When the color determination boundary line is a straight line passing through the origin in the hue plane, by executing an anisotropic enlargement or reduction (anisotropic scaling) on the hue plane, the color determination boundary line having an arbitrary gradient can be obtained.

Figure 13:
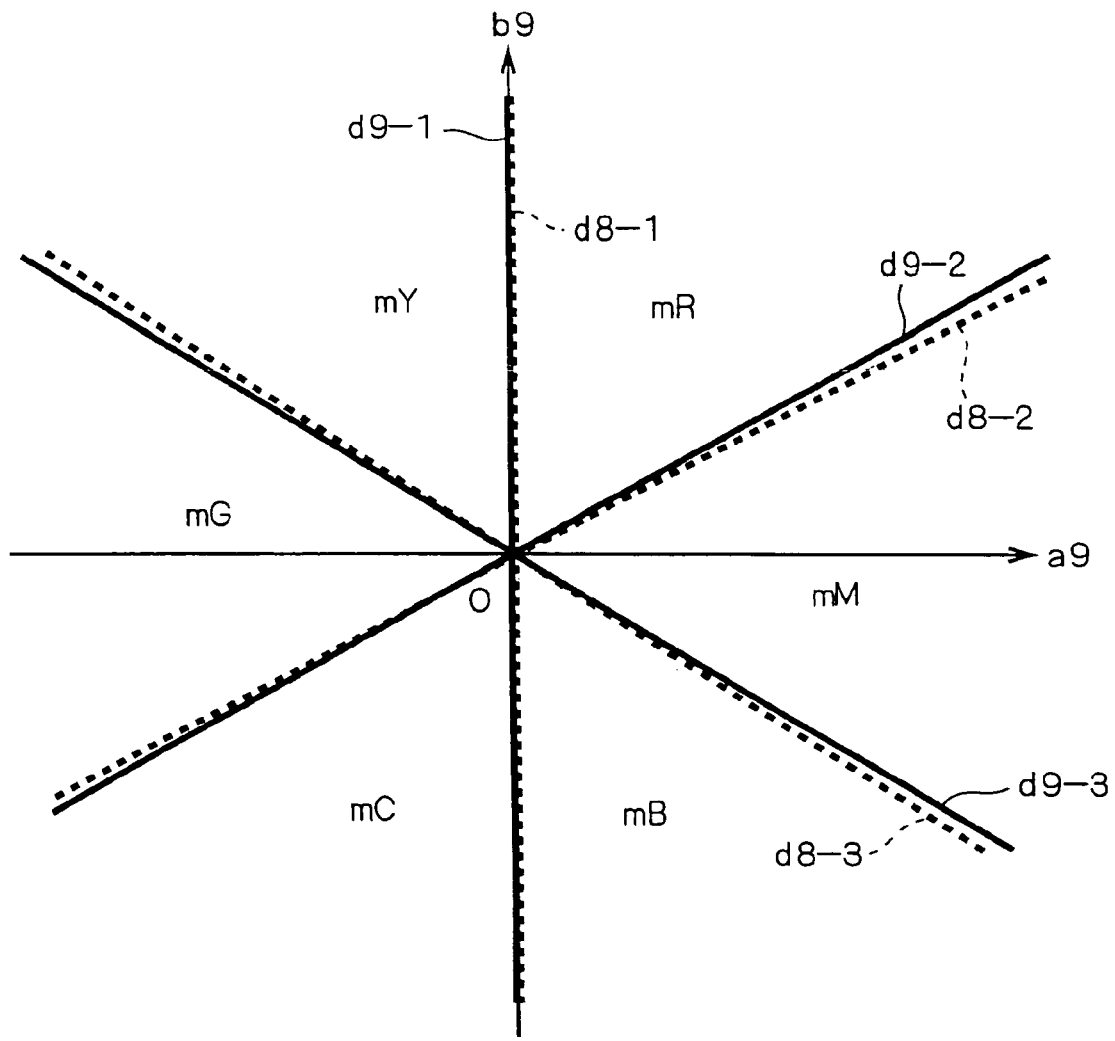
FIG. 13 is a view illustrating a hue plane H9 corresponding to a processing mode 9.

For example, when a part of a plurality of color determination boundary lines already matches with either one of the coordinate axes (refer to FIG. 13), by using the anisotropic scaling conversion, while a part of the plurality of the color determination boundary lines is matched with one of the coordinate axes, a gradient of the remaining color determination boundary line with respect to each coordinate axis can be changed.

(3-3. Third Conversion Processing Element) A third conversion processing element is a translation conversion. The translation conversion with respect to a two-dimensional plane can be generally expressed by the following formula:

$$\begin{pmatrix} X_2 \\ Y_2 \end{pmatrix} = \begin{pmatrix} X_1 \\ Y_1 \end{pmatrix} + \begin{pmatrix} p \\ q \end{pmatrix}$$ [Formula 5]

Parameters p and q are constants of the translation conversion and set according to a position of the color determination boundary line.

An advantage of using such a translation will be referred later.

(4. Individual Processing Mode of Region Determination) Next, a description will be made individually of a hue plane, which has been executed with various conversion processes combining the above-described three conversion processing elements, and a region determination processing in the hue plane.

A purpose for carrying out the conversion process is broadly classified into two purposes. A first purpose is to obtain a color determination boundary line, which can reduce a calculation amount in the determination. A second purpose is to solve complexity of the determination process resulting from a type of the three-dimensional color space or an error depending on a model of each machine.

Various processing modes according to the first purpose are broadly classified into a boundary adjusting method and a mutual adjusting method. Under the boundary adjusting method, an affine conversion is executed on a standard color determination boundary line to rationalize the gradient of the color determination boundary line with respect to the coordinate axis of the hue plane (two-dimensional color plane). Accordingly, a new color determination boundary line is prepared and can be used. Meanwhile, a position on the hue plane is determined without executing a conversion on the determining image data (in the present preferred embodiment, the unit data). Under the mutual adjusting method, an affine conversion is executed on a standard color determination boundary line to rationalize the gradient of the color determination boundary line with respect to the coordinate axis of the hue plane. Accordingly, a new color determination boundary line is prepared and can be used. In addition, the same affine conversion is also executed on the determining image data.

Under the boundary adjusting method, a position of the image data on the hue plane does not change. Accordingly, compared with a case in which no conversion is executed, an error may occur in the result of the color determination for an amount of the change that generates when the color determination boundary line is converted. However, compared with a major calculation advantage (to be described later) obtained by rationalizing the gradient of the color determination boundary line, an error resulting from the rationalization of the gradient is small. There exists a significant meaning for executing such a conversion.

Under the boundary adjusting method, a color determination boundary line, which has been executed with the affine conversion previously on the standard color determination boundary line, is set and stored in the digital color MFP 100. For the image data, the process proceeds onto a region determination process without executing the conversion. Therefore, in case of using only the boundary adjusting method, step S4 of the flowchart of FIG. 2 is skipped.

Meanwhile, under the mutual adjusting method, the same conversion is executed on both the color determination boundary line and the image data. Therefore, a relative positional relation between the color determination boundary line and the image data does not change from before the conversion. However, a positional relation between a coordinate axis of the hue plane and a color determination boundary line changes. Accordingly, the mutual adjusting method has a characteristic that a comparison calculation for the hue determination is particularly facilitated (also to be described later).

Under the mutual adjusting method, the affine conversion is previously executed on the standard color determination boundary line to obtain a new color determination boundary. The new color determination boundary is set and stored in the digital color MFP 100. In addition, the affine conversion is also executed on the determining image data, and the process proceeds onto the region determination processing. The process of step S4 of the flowchart of FIG. 2 is provided for the mutual adjusting method.

For a more effective application of such a conversion which rationalizes the gradient with respect to the coordinate axis of the hue plane (hereinafter a "rationalization conversion"), one or both of the following preliminary processing modes can be carried out prior to the rationalization conversion or carried out integrally with a combination with the rationalization conversion according to necessity. The preliminary processing modes support the second purpose described above. (1) "Input and output environment correction": A conversion of image data for compensating, for example, an error depending on an environment of an image input device or an image forming device. (2) "Color space compensation": A direction or the like of the color determination boundary line generally differs according to a type of a color space in which image data to be determined is expressed. Under the color space compensation, the difference is compensated and the color determination boundary line is handled uniformly. Therefore, a specific standard color space (in the following example, a Lab color space) is defined and image data expressed by a color space other than the standard color space is converted into the standard color space.

Both the input and output environment error correction and the color space compensation just convert the image data and do not necessarily require a conversion of the color determination boundary line. Thus, the input and output environment error correction and the color space compensation can be referred to as an "image data adjusting method" that is different from the two large classifications described above. Also in this case, the conversion of the image data is executed at step S4 of flowchart of FIG. 2.

As described below, there is a mode in which at least two of the boundary adjusting method, the mutual adjusting method and the image data adjusting method are carried out sequentially or at least two of the methods are combined and carried out collectively. In this case, the mode as a whole belongs to the mutual adjusting method.

In the following, a description will be made of various examples of the processing modes and a color determination processing for each of the examples. Since many examples will be described, a difference between each of the examples will be listed below.

In the following, a "gradient of a color determination boundary line with respect to a coordinate axis of a hue plane" will be referred to as a "gradient of a color determination boundary line" or simply as a "gradient".

1) processing mode 1: preliminary conversion ("input and output environment error correction": image data adjusting method)

2) processing mode 2: preliminary conversion ("color space compensation": image data adjusting method)

3) processing mode 3: basic rationalization ("simple rationalization of gradient": boundary adjusting method)

4) processing mode 4: rationalization for matching a part of the color determination boundary lines with the coordinate axis ("simple coordinate axis matching": boundary adjusting method)

5) processing mode 5: rationalization for rotating the entire color determination boundary lines and matching a part of the color determination boundary lines with the coordinate axis ("rotation coordinate axis matching": mutual adjusting method)

6) processing mode 6: rationalization for aligning a pair of color determination boundary lines passing through the origin into one straight line, in addition to the basic rationalization ("rationalization aligning": boundary adjusting method)

7) processing mode 7: a combination of the processing mode (aligning) and the processing mode (simple coordinate axis matching) (boundary adjusting method)

8) processing mode 8: a mode in which the processing mode (rotation coordinate axis matching) is carried out after the processing mode (aligning) (mutual adjusting method)

9) processing mode 9: a mode in which the processing mode 6 (aligning) is carried out after the processing mode (rotation coordinate axis matching) (mutual adjusting method)

10) processing mode 10: rationalization for carrying out the processing mode 6 (aligning), the processing mode (rotation coordinate axis matching) and an anisotropic scaling (mutual adjusting method)

11) processing mode 10K: rationalization of a color determination boundary line of an achromatic region (boundary adjusting method)

12) processing mode 11: rationalization accompanying a translation of a color determination boundary line of an achromatic region (mutual adjusting method)

13) processing mode 11K: rationalization of a color determination boundary line for carrying out a color/monochrome determination and a hue determination (mutual adjusting method)

In the following description, a prescribed color determination boundary line to be a standard will be referred to as a "color determination standard boundary line", a hue plane corresponding to a prescribed standard color space will be referred to as a "standard hue plane", a hue plane corresponding to a Ycc color space will be referred to as a "Ycc hue plane", a hue plane corresponding to a Lab color space will be referred to as a "Lab hue plane", image data expressed by the Ycc color space will be referred to as "Ycc image data", and image data expressed by a Lab color space will be referred to as "Lab image data".

(Processing Mode 1) Due to a feature of a scanner as an image input device or a printer as an image forming device, various gaps may generate in the Ycc color space (FIG. 4) or the Lab color space (FIG. 5). For example, due to a feature of the scanner, a minute gap (error) generates with respect to a direction of an a axis when mapping in the Lab color space. To compensate such an error, according to the processing mode 1, a conversion on the hue plane is carried out by using the third conversion processing element (translation). Translation parameters p and q in the translation conversion are set according to a feature of the scanner or the printer, which is used actually, to conform with a feature of a prescribed image input device or an image forming device to be a standard.

The processing mode 1 is one of the preliminary conversions, corresponds to the "input and output environment error correction", and belongs to the image data adjusting method. Therefore, under the processing mode 1, the color determination boundary line is changed relatively with respect to the image data.

The input image data in the following examples includes image data which has been executed with the processing mode 1.

(Processing Mode 2) According to the processing mode 2, to enable a common color determination routine to be applied even when image data is expressed by a color space of any one of a plurality of types of the color space, a color determination boundary line in the color space expressing the image data is converted into a color determination boundary line on a standard hue plane.

Suppose that a Lab hue plane is preset as a standard hue plane color. In addition, suppose that the image data is expressed by the Ycc hue plane H01 of FIG. 4, and the Ycc hue plane H01 is sectioned into hue partial regions mC through mG of six colors C, B, M, R, Y and G by six hue boundary lines d01. In this case, by executing the "processing mode 2" on the hue plane H01, a hue plane H2 (FIG. 6) is obtained.

The "processing mode 2" includes a reflection conversion and the first conversion processing element (rotation). More specifically, the processing mode 2 is a combined conversion of a reflection conversion with respect to a cr axis and a rotation conversion of θ=35 degrees. The processing mode 2 can be expressed by the following conversion formula:

$$\begin{pmatrix} X_2 \\ Y_2 \end{pmatrix} = \begin{pmatrix} \cos 35 & -\sin 35 \\ \sin 35 & \cos 35 \end{pmatrix} \begin{pmatrix} 1 & 0 \\ 0 & -1 \end{pmatrix} \begin{pmatrix} X_1 \\ Y_1 \end{pmatrix}$$ [Formula 6]

Figure 6:
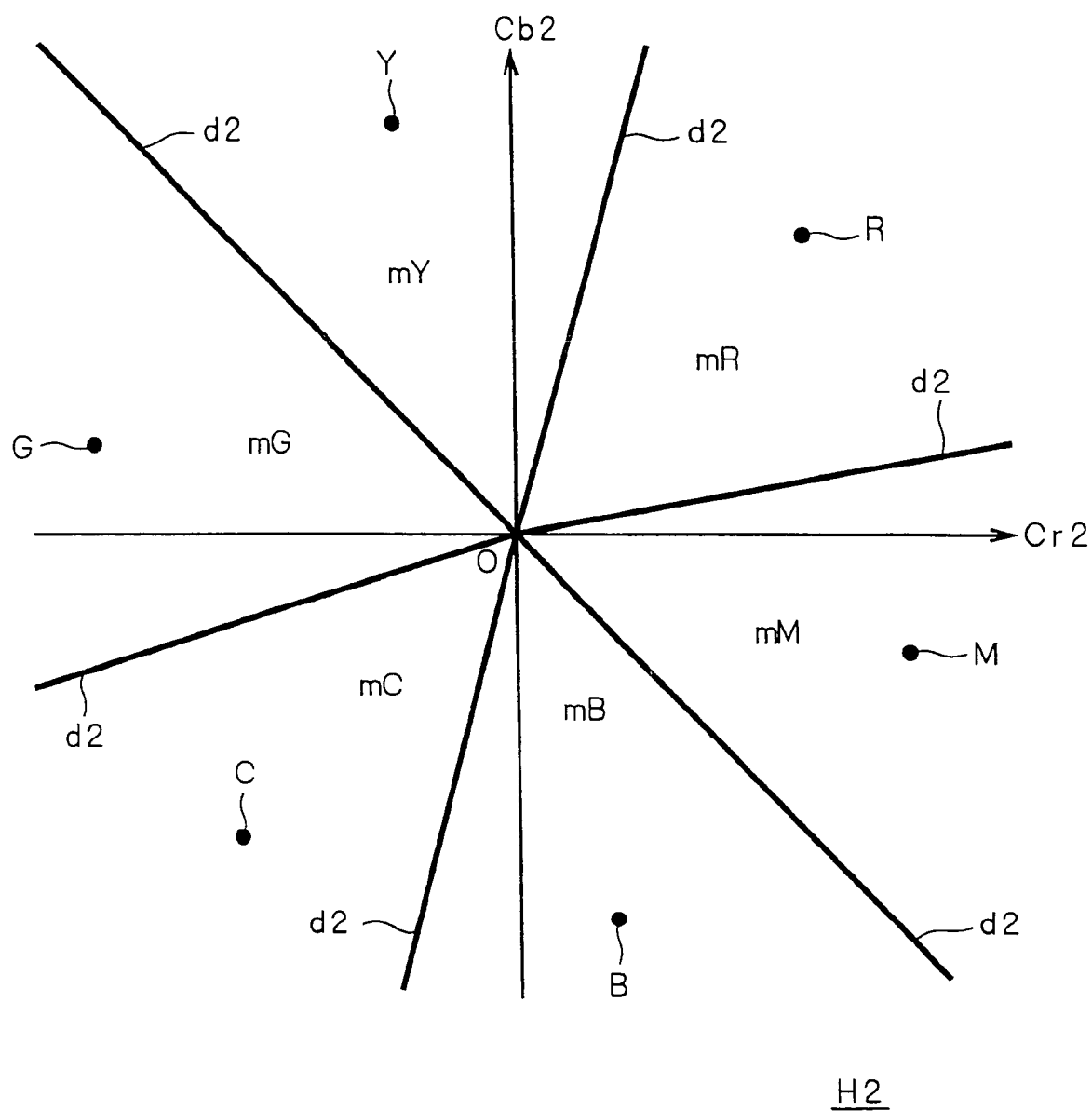
FIG. 6 is a view illustrating a hue plane H2 corresponding to a processing mode 2.

A color determination boundary line d2 in the Ycc hue plane H2 illustrated in FIG. 6 is located at substantially the same position as the color determination boundary line d02 of the Lab hue plane H02 illustrated in FIG. 5. That is, by executing the processing mode 2 on the Ycc image data, a color determination that is common with the Lab image data can be carried out on the Ycc image data.

The processing mode 2 is one of the preliminary conversions and corresponds to a conversion for the "color space compensation" and belongs to the image data adjusting method.

The following examples includes a case in which the input image data is Lab image data, and also a case in which the input Ycc image data is converted equivalently into Lab image data by the processing mode 2.

(Processing Mode 3) The processing mode 3 is a most basic rationalization conversion. The processing mode 3 is a process for changing a color determination boundary line having an irrational gradient into a color determination boundary line having a rational gradient closest to the irrational gradient.

Figure 7:
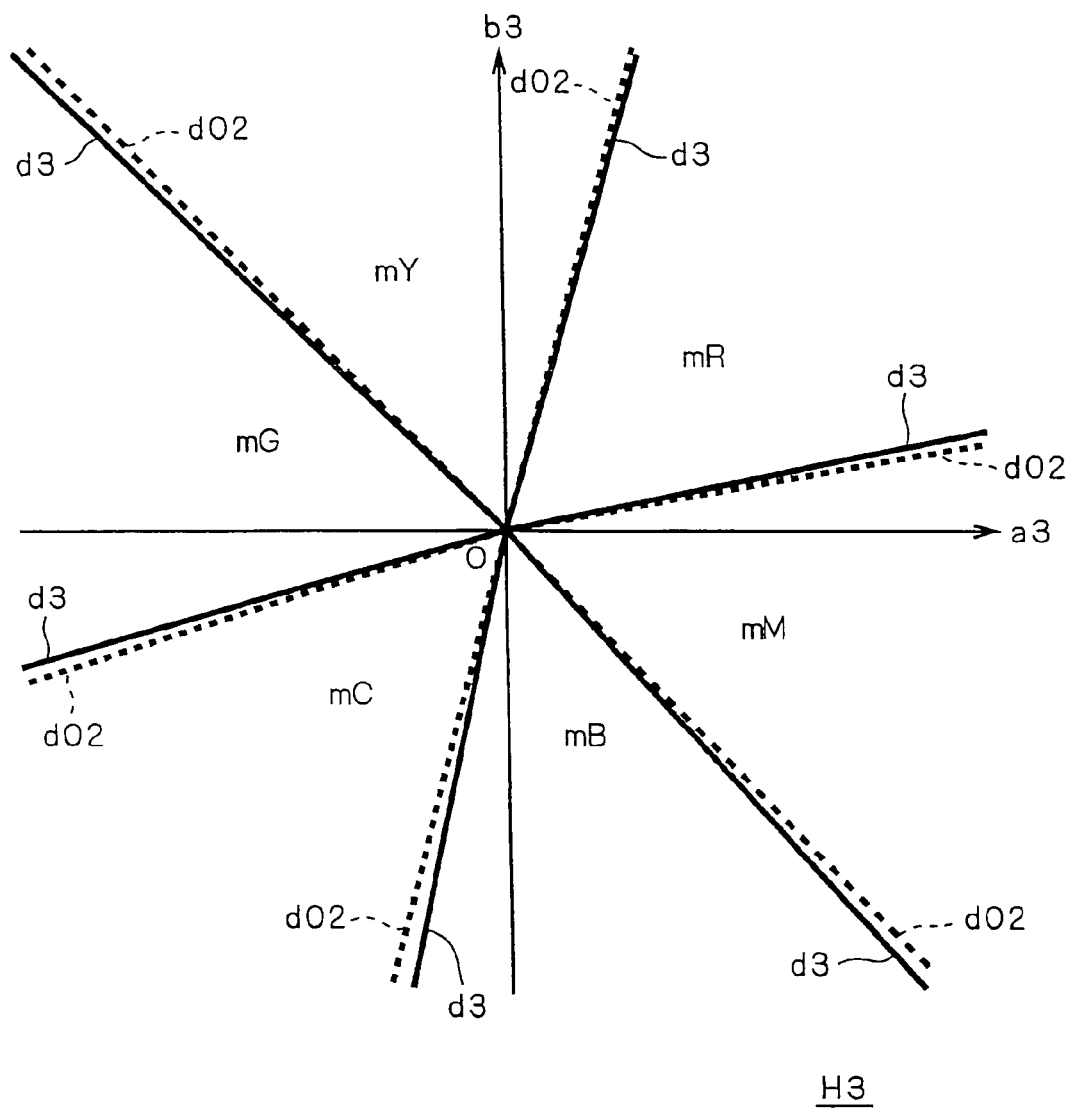
FIG. 7 is a view illustrating a hue plane H3 corresponding to a processing mode 3.

For example, the Lab hue plane H02 of FIG. 5 is sectioned into hue partial regions mC through mG of six colors C, B, M, R, Y and G by six color determination standard boundary lines d02. When the gradient of the color determination standard boundary lines d02 is an irrational number, each of the color determination standard boundary lines d02 is converted into a color determination boundary line d3 having a rational gradient closest to the irrational gradient (FIG. 7). In FIG. 7, the gradient of the six color determination standard boundary lines d02 are all assumed to be irrational numbers and all of the color determination standard boundary lines d02 are converted into the color determination boundary lines d3 having a rational gradient. When only a part of the color determination standard boundary lines d02 has an irrational gradient, only the color determination standard boundary line d02 having the irrational gradient can be rationalized. Further, an a3 axis of FIG. 7 is the same as the a axis of FIG. 5, and a b3 axis of FIG. 7 is the same as the b axis of FIG. 5.

The gradient after the conversion is preferably a rational number with a minimum difference with respect to a value of the gradient before the conversion. When a number of digits of the rational number is large, among irreducible fractions having a numerator and a denominator with a prescribed number of digits or smaller, an irreducible fraction with a smallest difference with respect to the irrational number can be selected. An amount of change of a position of the color determination boundary line before and after the conversion is minute, and an error resulting from the rationalization is small. The determining image data (more specifically, the unit data) cannot take a data component value of an irrational number. Thus, an accuracy of the color determination is not lowered by the processing mode 3.

Since the processing mode just carries out a conversion of the color determination boundary line, the processing mode 3 belongs to the boundary adjusting method. Therefore, when carrying out just the processing mode 3, a conversion of the image data is unnecessary.

(Determination Processing 3) Next, a description will be made of a processing (determination processing 3) for determining as to unit data of the determining image data D3, which has been executed with the processing mode 3, belongs to which partial region in a hue plane H3 (step S6 of FIG. 2).

Figure 19:
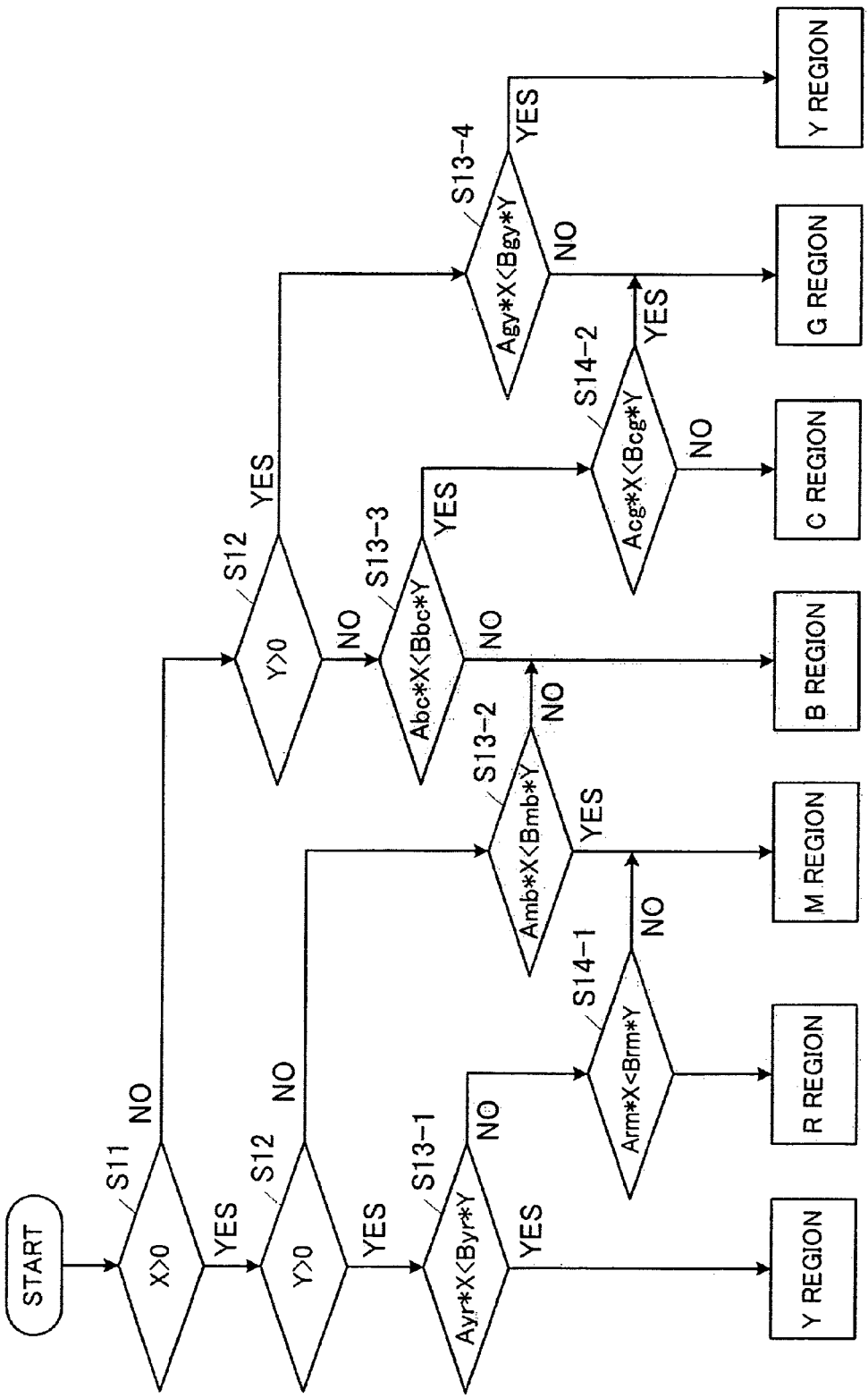
FIG. 19 is a flowchart illustrating a region determination processing operation 3.

FIG. 19 is a flowchart of a determination processing operation of the determining image data D3, which has been executed with the processing mode 3. The unit data to be determined is expressed by a coordinate (x, y) in the hue plane H3.

First, a determination is carried out as to the unit data belongs to which quadrant of four quadrants of the hue plane H3 in accordance with a sign of x and y (steps S11 and S12).

When a determination is made that the unit data belongs to a first quadrant, a determination is carried out as to the unit data belongs to which one of the hue partial regions mY, mR and mM. For example, suppose that a gradient of the color determination boundary line d3 at a region boundary between the hue partial regions mY and mR is (Ayr/Byr). Then, when $$Ayr \times x < Byr \times y$$ [Formula 7]

a determination is made that the unit data belongs to the hue partial region mY (step S13-1).

In case a determination is made that the unit data does not belong to the hue partial region mY, suppose that a gradient of the color determination boundary line d3 at a region boundary between the hue partial regions mR and mM is (Arm/Brm). Then, when $$Arm \times x < Brm \times y$$ [Formula 8]

a determination is made that the unit data belongs to the hue partial region mR. When a determination is made that the unit data does not belong to the hue partial region mR, a determination is made that the unit data belongs to the hue partial region mM (step S14-1).

When a determination is made that the unit data belongs to a quadrant other than the first quadrant, a determination as to the unit data belongs to which hue partial region is carried out by the same processing. Further, for example, in case of a second quadrant, a determination can be just carried out as to the unit data belongs to which of the hue partial regions mM and mB (step S13-2).

When the above-described processes of steps S11 through S14 are completed for all of the unit data, the region determination processing ends.

The six color determination boundary lines d3 do not include an irrational part. That is, A and B at steps S13 and S14 of the region determination are integer. Therefore, compared with a case in which the color determination standard boundary line d02 including an irrational part is used directly, a calculation amount in the region determination (color determination) can be reduced.

The processing mode is the boundary adjusting method. The processing mode is accomplished by previously converting the color determination standard boundary line into a color determination boundary line having a rational gradient and storing a value of the gradient in the ROM 20 or the RAM 30 of FIG. 1.

Therefore, when carrying out the processing mode 3 independently, the process does not accompany a conversion of the image data (unit data).

The processing mode can be executed without carrying out an integral rotation of the hue plane. Thus, the processing mode can be referred to as the "simple rationalization of gradient".

(Processing Mode 4) The processing mode is a rationalization conversion for matching a part of the color determination boundary lines with a coordinate axis, and can be referred to as the "simple coordinate axis matching". A reason why the processing mode is referred to as "simple" is because to distinguish from the "rotation coordinate axis matching" to be described hereinafter.

All of the six color determination boundary lines d3 of FIG. 7, which have been executed with the processing mode 3, i.e. the "simple rationalization of gradient", do not match with the coordinate axis. Therefore, a value of a gradient corresponding to a rational number is required to be set and a region determination is required to be carried out. Meanwhile, if a part of the six color determination boundary lines is matched with the coordinate axis, in the region determination in which the color determination boundary line matched with the coordinate axis is handled as the region boundary, a determination as to the image data (unit data) belongs to which side of the color determination boundary line can be carried out just by a plus or a minus sign of the image data.

Figure 8:
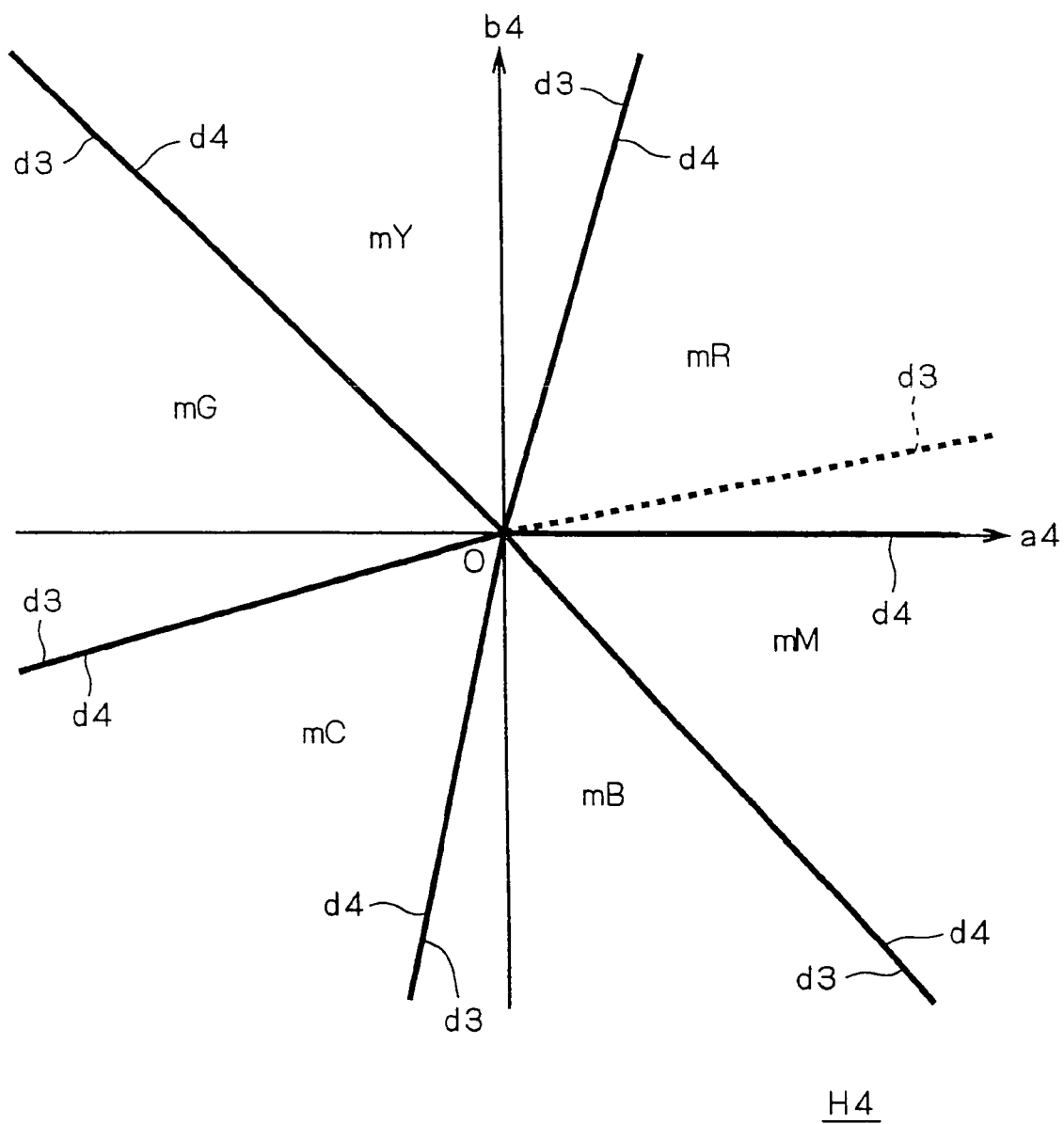
FIG. 8 is a view illustrating a hue plane H4 corresponding to a processing mode 4.

The processing mode is a conversion constituted from such an aspect. In the example of FIG. 8, a conversion is carried out to match a part of a color determination boundary line group d3 (in the drawing, one boundary line) with the coordinate axis (for example, the a axis) and a color determination boundary line d4 is obtained. Further, an a4 axis of FIG. 8 is the same as the a axis of FIG. 5, and a b4 axis of FIG. 8 is the same as the b axis of FIG. 5.

The processing mode just converts and sets a specific color determination boundary line. Thus, the processing mode 4 belongs to the boundary adjusting method. When carrying out just the processing mode 4, a conversion of the image data is unnecessary.

A position of the color determination boundary line d4 is defined by the following method. First, a determination is carried out as to which one of the color determination boundary lines before the conversion is closest to a coordinate axis (can be either one of coordinate axes) of a hue plane H4. A position and a direction of a color determination boundary line other than the color determination boundary line having a gradient closest to the coordinate axis are stored directly. Meanwhile, the color determination boundary line having the gradient closest to the coordinate axis is converted so as to be matched with the closest coordinate axis.

Further, a method for selecting the color determination boundary line to be matched with the coordinate axis is not limited to the above-described example. For example, a color determination boundary line closest to a prescribed coordinate axis may be matched with such a prescribed coordinate axis.

In the above-described example, only the color determination boundary line having the gradient closest to the coordinate axis is matched with the coordinate axis. As another example, a color determination boundary line having a gradient secondly closest to the coordinate axis may be matched with the coordinate axis. That is, a plurality of color determination boundary lines may be matched with the coordinate axis.

In this specification, when a gradient of at least one of the two coordinate axes intersecting perpendicularly on the hue plane is a rational number, a gradient of the color determination boundary line is assumed to a rational number. Therefore, for example, when the color determination boundary line is matched with the b axis of the Lab color space of FIG. 7 to be described hereinafter, a gradient is infinite when seen from the a axis. Thus, a distinction between a rational number and a irrational number becomes vague. However, since the gradient with respect to the b axis is "0" (rational number), such a color determination boundary line is handled as having a rational gradient. Thus, the processing mode also satisfies the condition of the rationalization conversion, which is a feature of the present invention.

(Determination Processing 4) Next, a description will be made of a determination processing in the hue plane H4.

Figure 20:
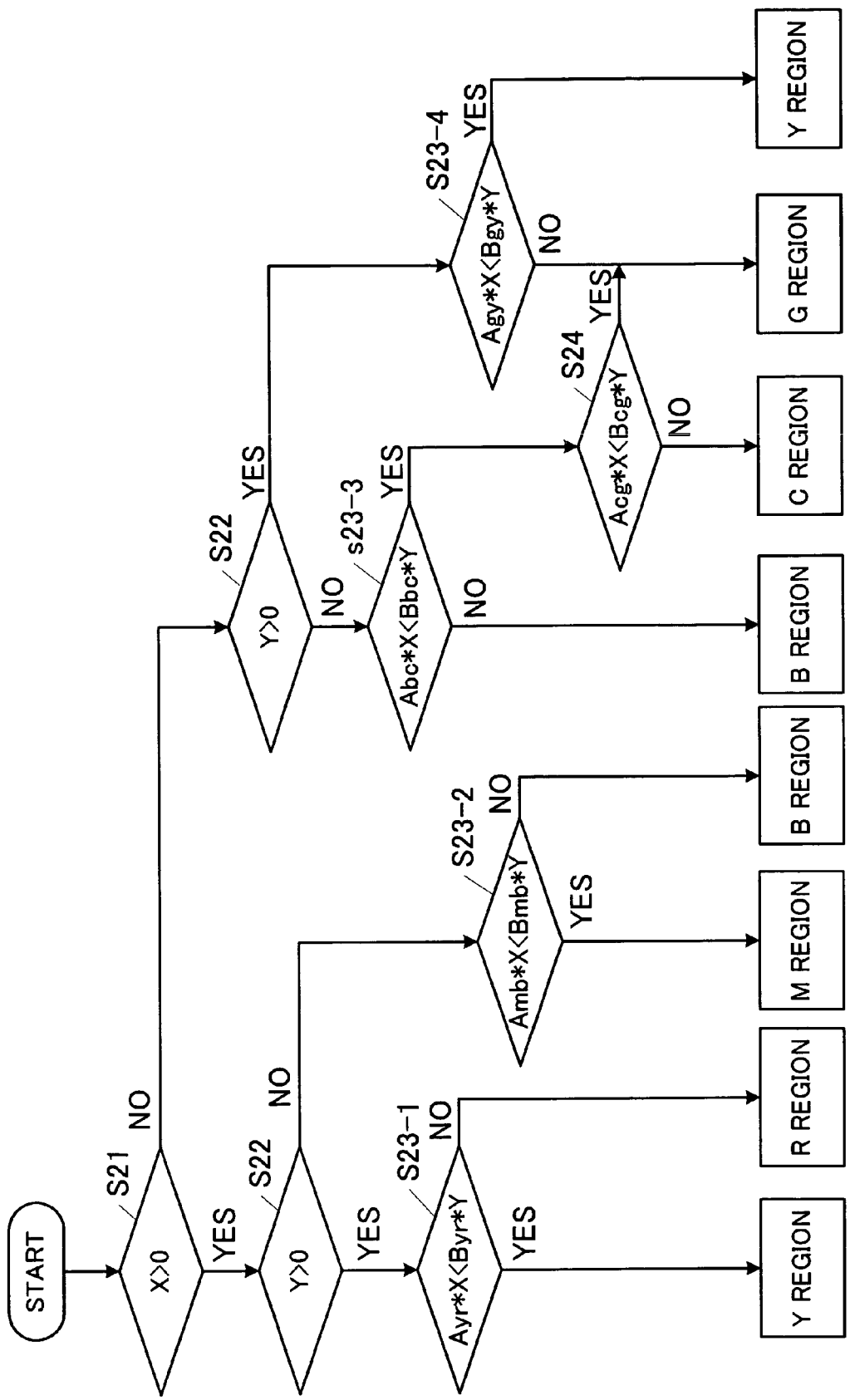
FIG. 20 is a flowchart illustrating a region determination processing operation 4.

FIG. 20 is a flowchart of the determination processing operation of the determining image data D3, which has been executed with the processing mode 4. Unit data to be determined is expressed by a coordinate (x, y) in the hue plane H4.

First, a determination is carried out as to the unit data belongs to which quadrant among the four quadrants of the hue plane H4 from the signs of x and y (steps S21 and S22). When a determination is made that the unit data belongs to a first quadrant, by the same method as the previous determination operation in the hue plane H3, a determination is carried out at to the unit data belongs to which one of the hue partial regions mY and mR.

When a determination is made that the unit data belongs to a quadrant other than the first quadrant, a determination as to the unit data belongs to which partial region is carried out by the same processing.

When the processes of steps S21 through S24 have been completed for all of the unit data, the region determination process ends.

A comparison will be made of the determination processing (FIG. 19) of the determining image data D3, which has been executed with the processing mode 4, and the determination processing (FIG. 18) of the determining image data D3 before being executed with the processing mode 3. In the determination processing 4, since the color determination boundary line d4 includes a portion matching with an axis, a determination operation corresponding to step S14-1 of FIG. 18 can be omitted. Thus, compared with a case in which the color determination boundary line d4 does not include a portion matching with the axis, a calculation amount in the region determination can be reduced.

(Processing Mode 5) In addition to the above-described processing mode in which only the color determination boundary line to be matched with the coordinate axis is moved, the method for matching a part of the plurality of the color determination boundary lines with the coordinate axis can be realized also by rotating the entire color determination boundary line group on the hue plane. That is, the first conversion processing element (rotation) among the affine conversion is used.

Figure 9:
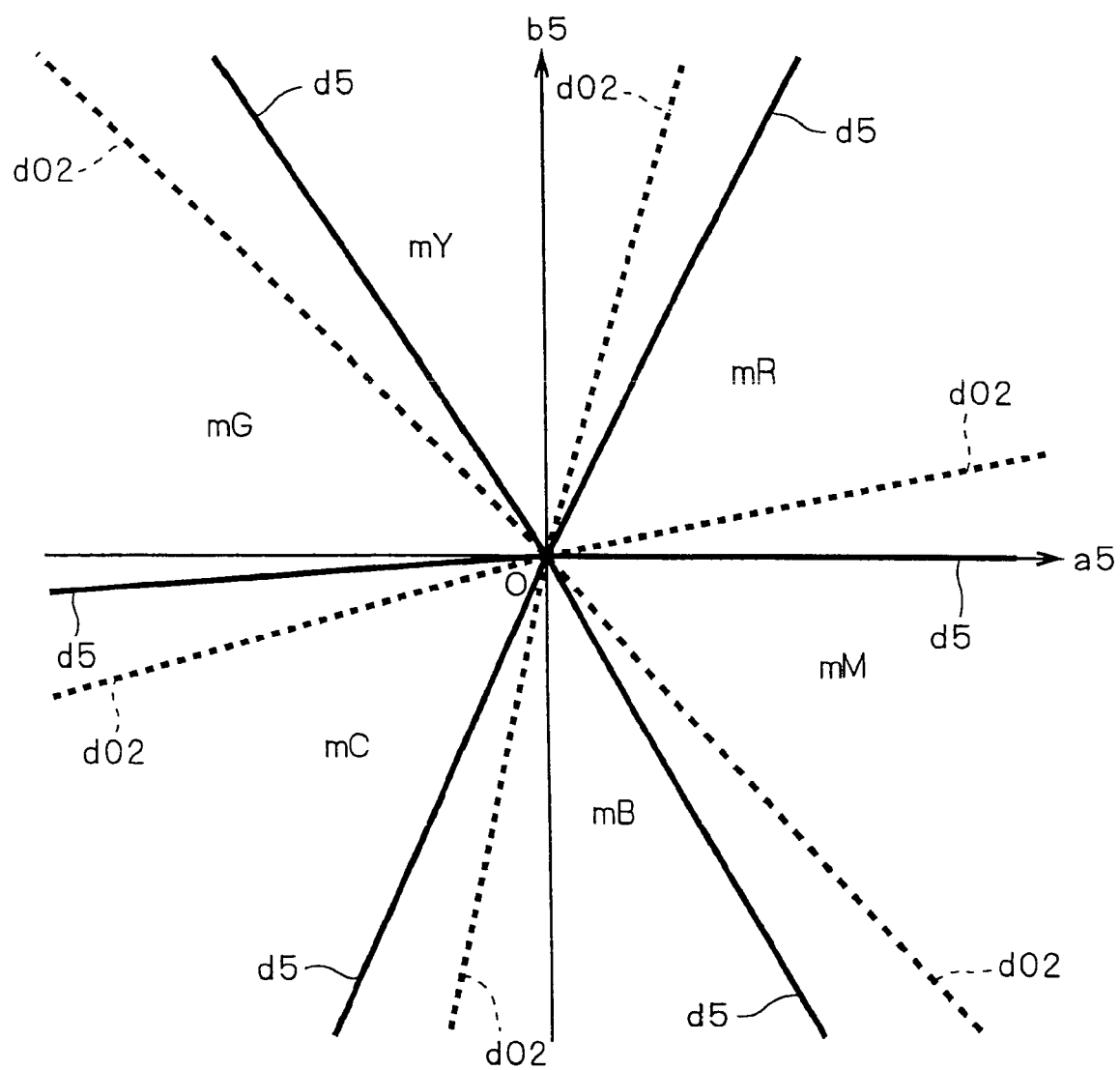
FIG. 9 is a view illustrating a hue plane H5 corresponding to a processing mode 5.

FIG. 9 illustrates an example of the processing mode which realizes the "rotation coordinate axis matching". As one example, FIG. 9 illustrates a group of the color determination standard boundary lines d02 of FIG. 5 as the color determination boundary line group before the rotation.

A position of color determination boundary lines d5, in other words, a rotational angle in the rotational conversion, is defined by the following method. First, an angle necessary for matching one color determination boundary line selected from the color determination boundary lines d02 before the conversion with a prescribed coordinate axis is derived. This angle is the rotational angle of the rotational conversion in the processing mode 5. Any arbitrary color determination boundary line can be selected. For example, a color determination boundary line having a gradient closest to an a axis can be selected. All of the color determination boundary lines are rotated by the rotational angle. A parameter defining each of the color determination boundary lines after the rotational conversion is stored in the ROM 20 or the RAM 30 and used. Further, the color determination boundary line matched with either one of the coordinate axes can be realized by a sign determination of the image data on the hue plane. Accordingly, a value of the gradient is not required to be stored.

Under the processing mode 5, determining image data is also rotated on a saturation plane for the same angle as the angle by which the color determination boundary line group has been rotated. That is, the rotational conversion is carried out for each unit data. The processing mode belongs to the mutual adjusting method. Therefore, although the a axis and the b axis in FIG. 9 face in a direction corresponding to the a axis and the b axis before the rotation of the hue plane, the a axis and the b axis are not facing the same direction with the a axis and the b axis after the rotation. When a rotational angle of the color determination boundary line group is θ, the a axis and the b axis face in a direction displaced by (−θ) from the a axis and the b axis after the rotation, respectively.

In the processing mode 5, a relative angle of each color determination boundary line constituting the color determination boundary line group does not change. In addition, the image data is rotated and a relative position with respect to the color determination boundary line is maintained. Therefore, even when the relative rotational angle becomes large, an accuracy of the color determination is not lowered. Thus, any color determination boundary line may be matched with the coordinate axis. As described above, the rotational angle can be defined so that the color determination boundary line closest to the prescribed coordinate axis is matched with the coordinate axis. Alternatively, a rotational angle may be set so that symmetry of the color determination boundary line group after the rotation with respect to the coordinate axis becomes the highest.

(Determination Processing 5) A determination processing in a hue plane H5 is the same as the determination processing (refer to FIG. 20).

A comparison will be made of the determination processing operation (FIG. 20) of the determining image data D3, which has been executed with the processing mode 5, and the determination processing operation (FIG. 29) of the determining image data D3, which has been executed with the processing mode 3. As described above, the determination operation corresponding to step S14-1 of FIG. 19 can be omitted. Therefore, compared with a case in which the color determination boundary line d4 does not include a portion that matches with the axis, a calculation amount in the region determination can be reduced without lowering the accuracy.

(Processing Mode 6) In the hue plane H02 of FIG. 5, among the six color determination boundary lines d3, a pair of two color determination boundary lines extend in substantially an opposite direction from one another. However, the pair of the color determination boundary lines is not necessarily one straight line in a strict sense. The pair of the color determination boundary lines is generally a "broken line". Therefore, a gradient of each of the color determination boundary lines of the pair is different from one another. Thus, different gradient values are required to be handled in the region determination. Under the processing mode 6, while satisfying a condition that each pair of the color determination boundary lines form one straight line, a rationalization of the gradient of each of the color determination boundary lines is carried out.

Figure 10:
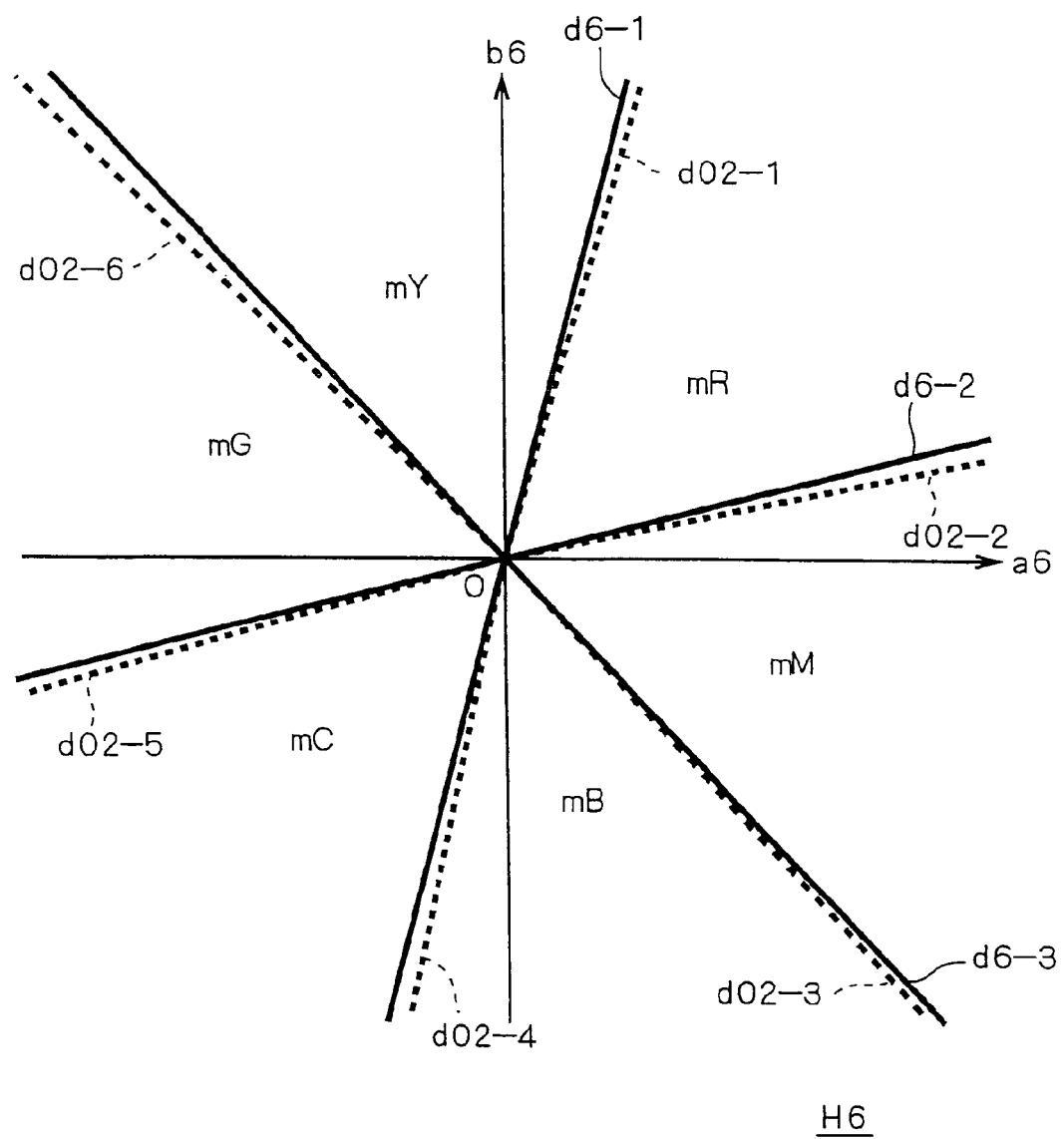
FIG. 10 is a view illustrating a hue plane H6 corresponding to a processing mode 6.

FIG. 10 illustrates an example of a hue plane H6 in the processing mode 6. FIG. 10 illustrates color determination boundary lines d6 (d6-1 through d6-3), which have been executed with the conversion of the processing mode 6. In addition, FIG. 10 illustrates the color determination standard boundary lines d02 (d02-1 through d02-6) before the conversion with doted lines for a comparison. An a6 axis of FIG. 10 is the same as the a axis of FIG. 5. A b6 axis of FIG. 10 is the same as the b axis of FIG. 5.

A position of the color determination boundary lines d6 is defined by the following method. First, the six color determination standard boundary lines d02 (precisely, half lines having an origin as an end-point) before the conversion are classified into pairs of color determination boundary lines, which a difference of the gradients is respectively within a prescribed approximation difference, i.e., pairs of color determination boundary lines (d02-1 and d02-4), (d02-2 and d02-5) and (d02-3 and d02-6) having gradients which can be determined as substantially the same. The pairs of the color determination boundary lines (d02-1 and d02-4), (d02-2 and d02-5) and (d02-3 and d02-6) are respectively converted into new straight lines dO6-1 through dO6-3 having a gradient with an average value of the gradients of the two color determination boundary lines constituting each pair. When the average value is an irrational number, the pairs of the color determination boundary lines are converted into straight lines having a rational gradient which a difference with respect to the average value is minimum.

The processing mode is a process for converting the color determination boundary line. The processing mode does not necessary require the conversion of the image data. Thus, the processing mode belongs to the boundary adjusting method. The processing mode accompanies the basic rationalization and also a rationalization for aligning a pair of the color determination boundary lines passing through the origin. Thus, the processing mode can be referred to as the "rationalization aligning".

(Determination Processing 6) Next, a determination will be made of a determination processing in the hue plane H6.

Figure 21:
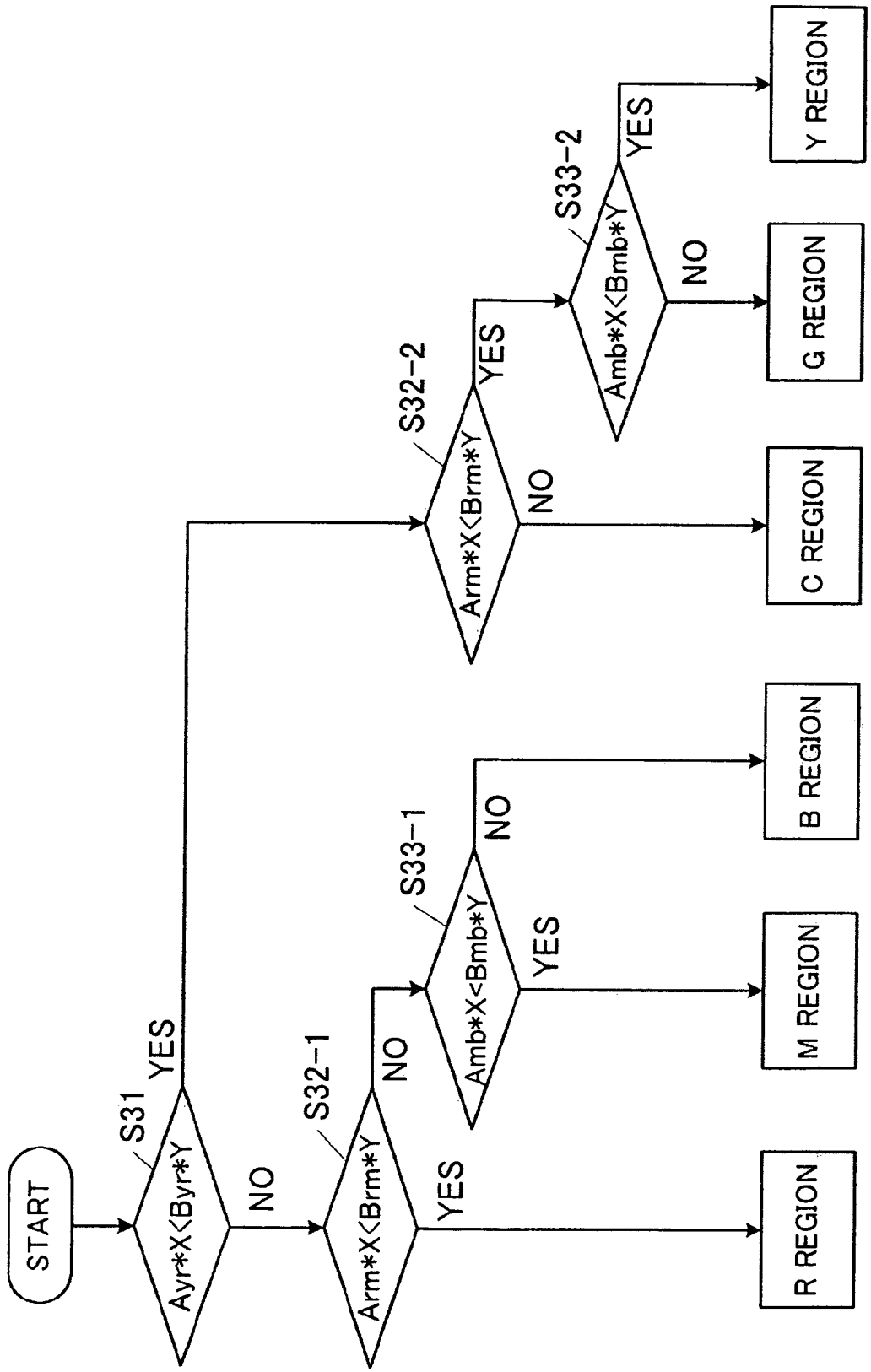
FIG. 21 is a flowchart illustrating a region determination processing operation 6.

FIG. 21 is a flowchart of the determination processing operation of the determining image data D3, which has been executed with the processing mode 6. Further, unit data to be determined is expressed by a coordinate (x, y) in the hue plane H6.

First, a determination is carried out as to the unit data belongs to which side with respect to the color determination boundary line d6-1 in the hue plane H3 (step S31). Next, a determination is carried out as to the unit data belongs to which side with respect to the color determination boundary line d6-2 (step S32). When a determination is made that the unit data belongs to neither the hue partial region mR nor the hue partial region mC, a determination is carried out as to the unit data belongs to which side with respect to the color determination boundary line d6-3 (step S33).

When the processes of steps S31 through S33 have been completed for all of the unit data, the region determination process ends.

Further, the color determination boundary lines d6 do not include a portion having an irrational gradient. That is, A and B at steps S31 through S33 of the region determination are an integer. Therefore, compared with a case in which the color determination boundary line includes an irrational gradient, a calculation amount in the region determination can be reduced. In addition, the region determination can be carried out by the determination operation with three steps. Therefore, compared with a case in which the gradients of the color determination boundary lines are different from one another, the calculation amount in the region determination can be reduced.

(Processing Mode 7) The processing mode is a combination of the processing mode (aligning) and the processing mode (simple coordinate axis matching), and belongs to the hue boundary adjusting method.

Figure 11:
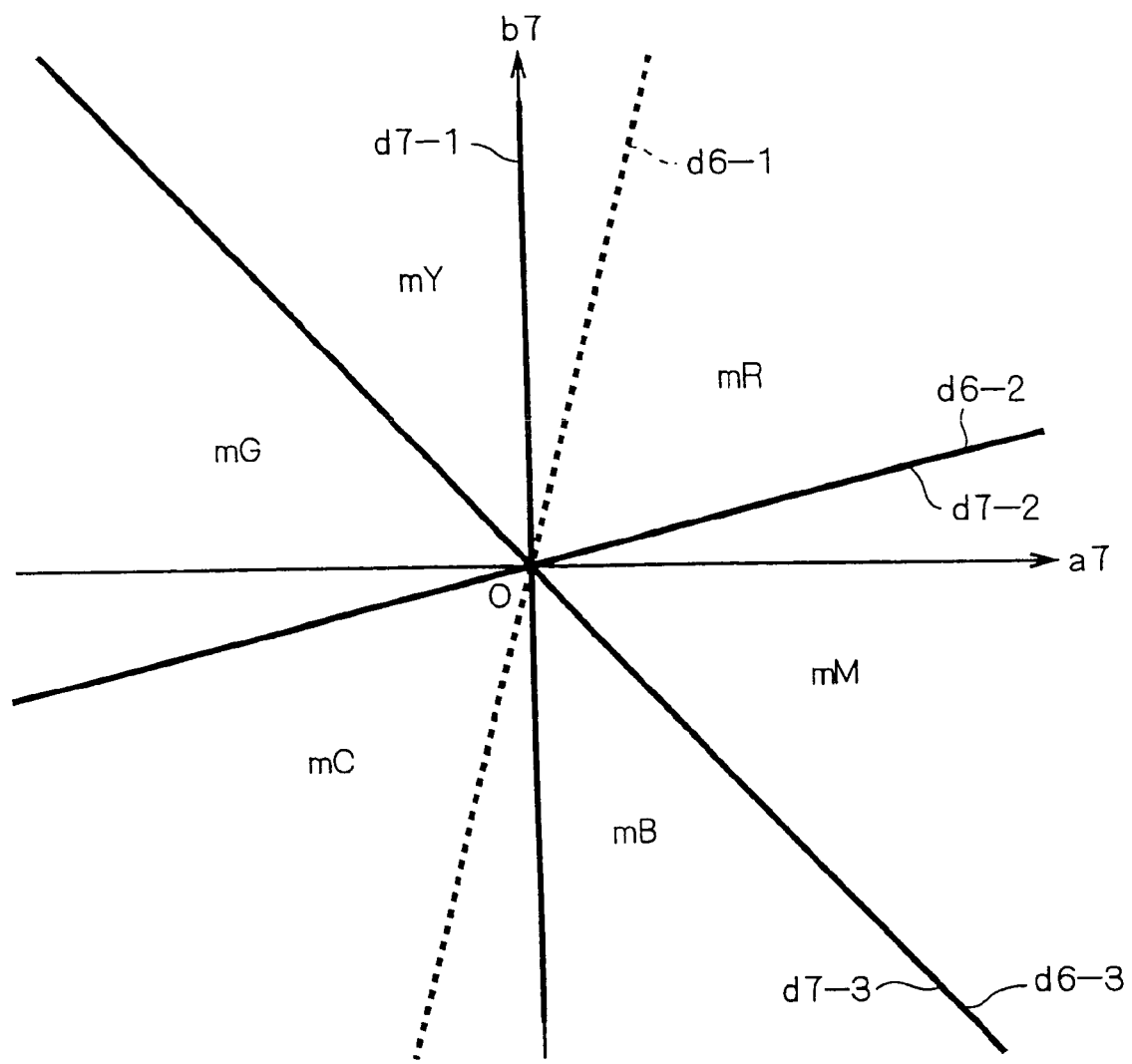
FIG. 11 is a view illustrating a hue plane H7 corresponding to a processing mode 7.

FIG. 11 illustrates a hue plane H7 of the processing mode 7. FIG. 11 illustrates color determination boundary lines d7 (d7-1 through d7-3) after the conversion. FIG. 11 also illustrates the color determination boundary lines d6 (d6-1 through d6-6) obtained in the processing mode with dashed lines for a purpose of comparison. In FIG. 11, one color determination boundary line d6-1 among the three color determination boundary lines d6 obtained by "aligning" is converted into a color determination boundary line d7-1 by the "simple coordinate axis matching". The procedures for carrying out the "aligning" and the "simple coordinate axis matching" are respectively the same as the processing mode and the processing mode 4.

(Determination Processing 7) Next, a description will be made of a determination processing in the hue plane H7.

Figure 22:
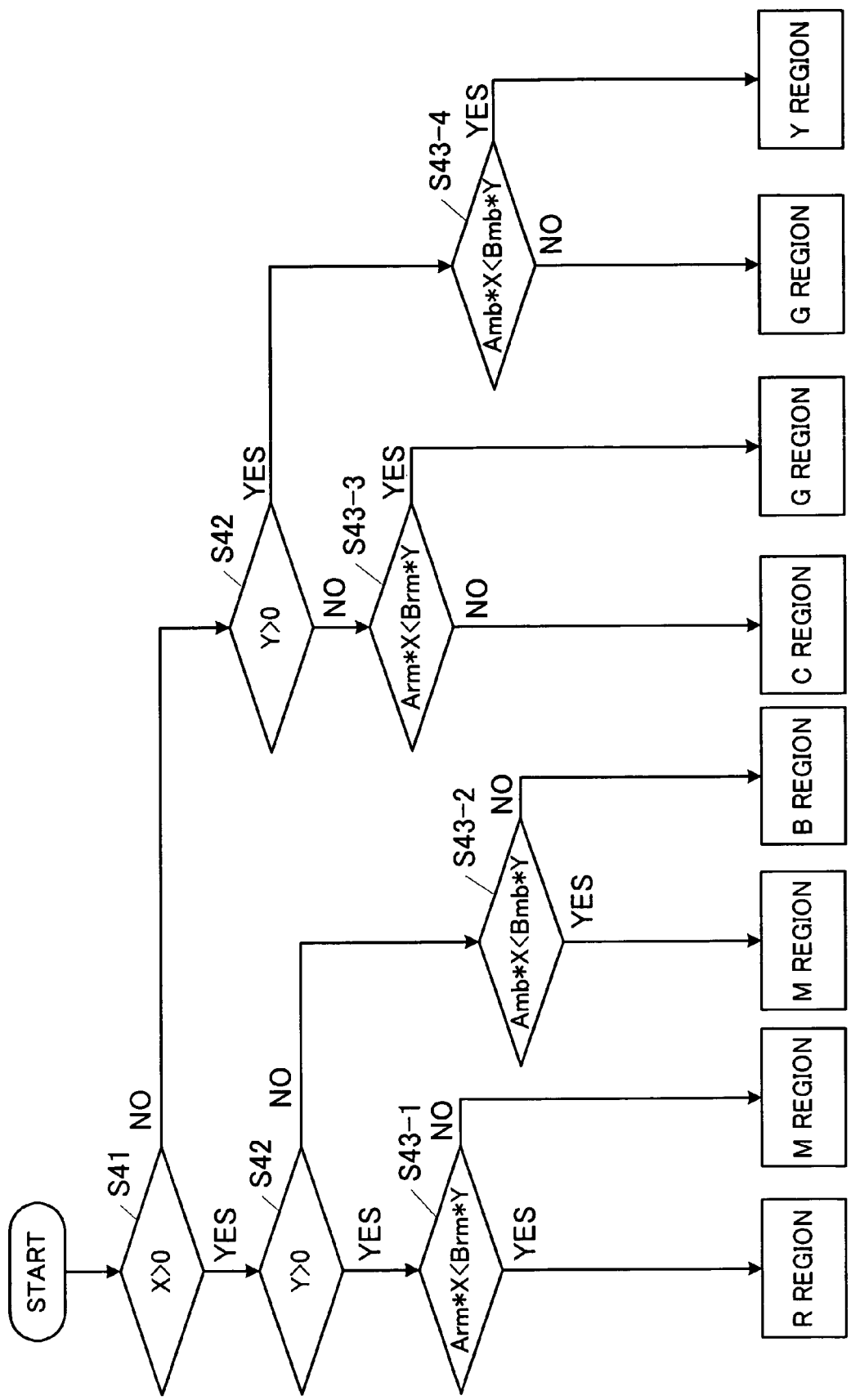
FIG. 22 is a flowchart illustrating a region determination processing operation 7.

FIG. 22 is a flowchart illustrating the determination processing operation of the determining image data, which has been executed with the processing mode 7. Unit data to be determined is expressed by a coordinate (x, y) in the hue plane H7.

First, a determination is carried out as to the unit data belongs to which quadrant among four quadrants of the hue plane H7 from a sign of x and y (steps S41 and S42). When a determination is made that the unit data belongs to a first quadrant, a determination is carried out as to the unit data belongs to either the hue partial region mY or mR (step S43).

When a determination is made that the unit data belongs to a quadrant other than the first quadrant, a determination is carried out as to the unit data belongs to which hue partial region by the same processing.

When the processes of steps S41 through S43 have been completed for all of the unit data, the region determination processing ends.

A comparison will be made of the determination processing (FIG. 21) of the determining image data D3 in the processing mode and the determination processing (FIG. 20) of the determining image data D3 before being executed with the process of the processing mode 7. In the determination processing 7, since the color determination boundary lines d7 include a portion matching with the axis, the determination operations corresponding to steps S31 and S32 of FIG. 20 can be carried out by a sign determination. Therefore, compared with a case in which the color determination boundary lines d7 do not include a portion matching with the axis, a calculation amount in the region determination can be reduced.

Figure 12:
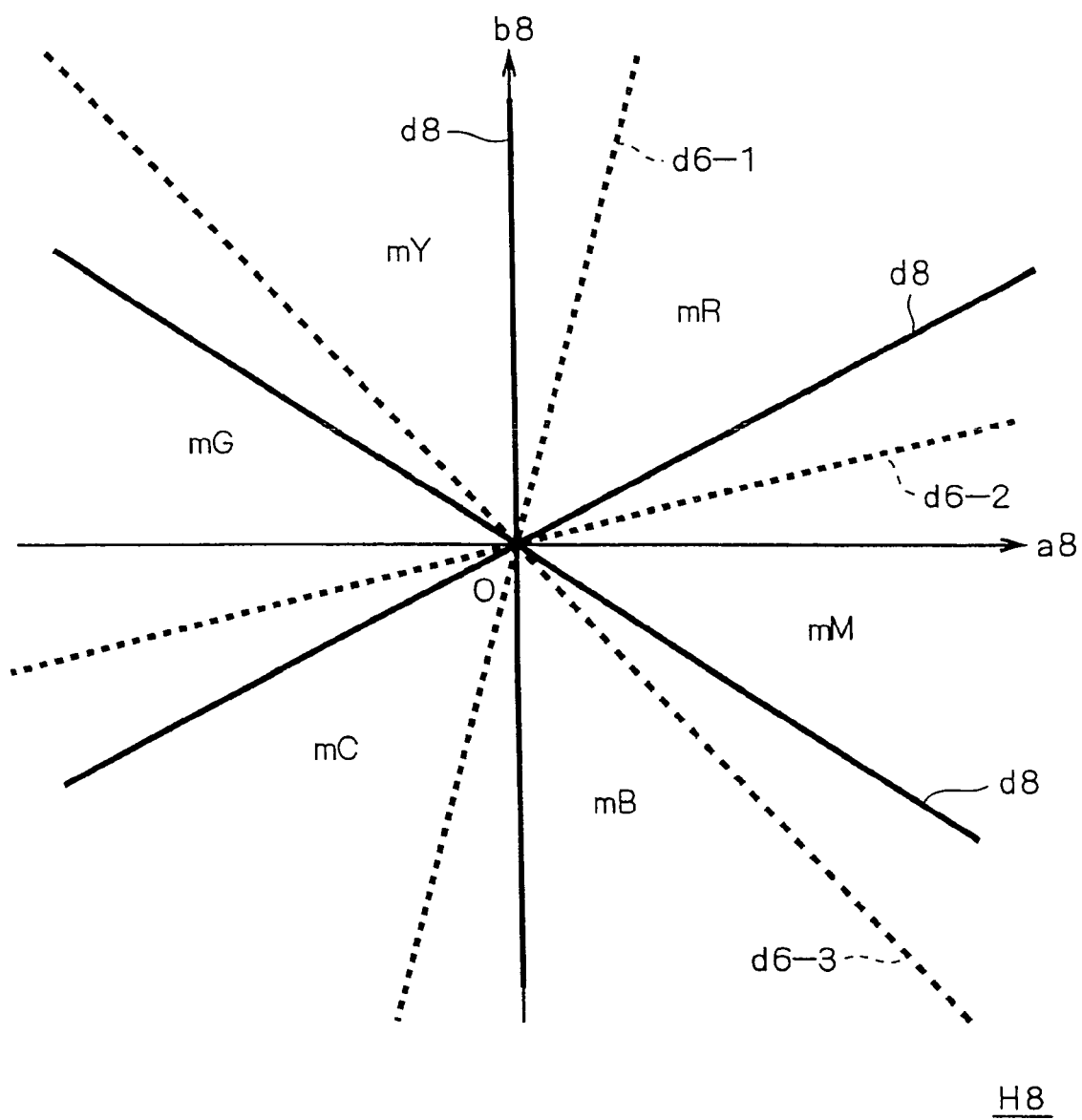
FIG. 12 is a view illustrating a hue plane H8 corresponding to a processing mode 8.

(Processing Mode 8) The processing mode is a mode in which the processing mode (rotation coordinate axis matching) is carried out after the processing mode (aligning). The processing mode belongs to the mutual adjusting method. Therefore, an a8 axis and a b8 axis of a hue plane H8 illustrated in FIG. 12 respectively face in a direction corresponding to the a axis and the b axis before the rotation of the hue plane. After the hue plane is rotated, the a8 axis and the b8 axis are displaced by (−θ) from the a axis and the b axis of FIG. 5, respectively (θ is a rotational angle of the color determination boundary line group).

When comparing with the color determination boundary lines d6-1 through d6-3 after the aligning, three color determination boundary lines d8 after the processing mode are rotated by θ as a whole. One of the color determination boundary lines d8 matches with the b8 axis.

The method for aligning and the method for selecting the rotational angle θ are the same as the processing mode and the processing mode 5. Since the processing mode is a both directions conversion method, the image data is also rotated by θ on the original hue plane and mapped on the new hue plane H8.

(Determination Processing 8) A determination processing in the hue plane H8 is the same as the determination processing (refer to FIG. 22).

In the determination processing 8, the following relation holds for a coefficient that appears in the formula in the determination processing operation.

$$\frac{Brm}{Arm} = \frac{Bcg}{Acg}$$ [Formula 9]
$$\frac{Bmb}{Amb} = \frac{Bgy}{Agy}$$

A comparison will be made of the determination processing 8 (FIG. 22) of the determining image data D3, which has been processed under the processing mode 8, and the determination processing (FIG. 21) of the determining image data D3 before being executed with the processing mode 8. In the determination processing 8, since the color determination boundary lines d8 include a portion matching with the axis, the determination operations corresponding to steps S31 and S32 of FIG. 20 can be carried out by a sign determination. Step S43-1 and step S43-3, and step S43-2 and step S42-4 can be carried out by the same formula, respectively. Therefore, compared with a case in which the color determination boundary lines do not include a portion matching with the axis, a calculation amount in the region determination can be reduced without lowering the accuracy.

(Processing Mode 9) The processing mode is a mode in which the processing mode (aligning) is carried out after the processing mode (rotation coordinate axis matching). The processing mode belongs to the mutual adjusting method.

Under the processing mode described above, after the "aligning" is carried out", the "rotation coordinate axis matching" is carried out. The processing mode is a processing in which an order of the processes of the processing mode is reversed. A specific color determination boundary line, which has been matched with one of the coordinate axes (a b9 axis in the example of a hue plane H9 of FIG. 13) by the "rotation coordinate axis matching", is immobilized in a subsequent "aligning" process. A gradient of a color determination boundary line, which is a counterpart of the specific color determination boundary line, is matched with a gradient of the specific color determination boundary line.

Therefore, after the "aligning", a color determination boundary line (a color determination boundary line d9-1 in the example of FIG. 13) and two other color determination boundary lines d9-2 and d9-3 can be obtained. Further, the color determination boundary line (the color determination boundary line d9-1 in the example of FIG. 13) is obtained by collectively arranging originally two color determination boundary lines on either one of coordinate axes (an a9 axis or a b9 axis).

Each of the two color determination boundary lines may be converted into a new straight line having an average value of absolute values of the gradients of both of the color determination boundary lines as an absolute value of the gradient, respectively. Further, the absolute value of the gradient is stored. When the average value is an irrational number, the color determination boundary lines are converted into a straight line having a rational gradient, which a difference with respect to the average value is minimum. Accordingly, the color determination boundary lines d9-2 and d9-3, which are line symmetric with one another with respect to a b10 axis, are obtained.

The remaining processes of the processing mode are the same as the processing mode 8.

(Determination Processing 9) A determination processing 9 in the hue plane H9 is the same as the determination processing 7 (refer to FIG. 22).

Further, when the color determination boundary lines d9-2 and d9-3 are line symmetric with one another with respect to the b10 axis, the following relation holds for a coefficient that appears in a formula of the determination processing operation:

$$\frac{Brm}{Arm} = \frac{Bcg}{Acg}$$

$$\frac{Bmb}{Amb} = \frac{Bgy}{Agy}$$

$$\frac{Brm}{Arm} = -\frac{Bmb}{Amb}$$

[Formula 10]

A comparison will be made of the determination processing of the determining image data D3, which has been executed with the processing mode 9, and the determination processing of the determining image data D3 before being executed with the processing mode 9. In the determination processing 9, an absolute value of a coefficient of each formula at steps S41-1 and S41-3, and steps S41-2 and S41-4 is equal. Therefore, compared with a case in which the color determination boundary lines are not symmetric with respect to an axis, a calculation amount in the region determination can be reduced.

(Processing Mode 10) An example of the conversion combining the "aligning" and the "rotation coordinate axis matching" includes the processing mode 8, which is a conversion in which the "rotation coordinate axis matching" is carried out after the "aligning", and the processing mode 9, which is a conversion in which the "aligning" is carried out after the "rotation coordinate axis matching". The processing mode is a conversion process which carries out a rationalization by carrying out an anisotropic scaling conversion (a processing mode for enlarging or reducing under a different ratio according to an axial direction) in addition to the abovementioned combination. The processing mode belongs to the mutual adjusting method.

Figure 14:
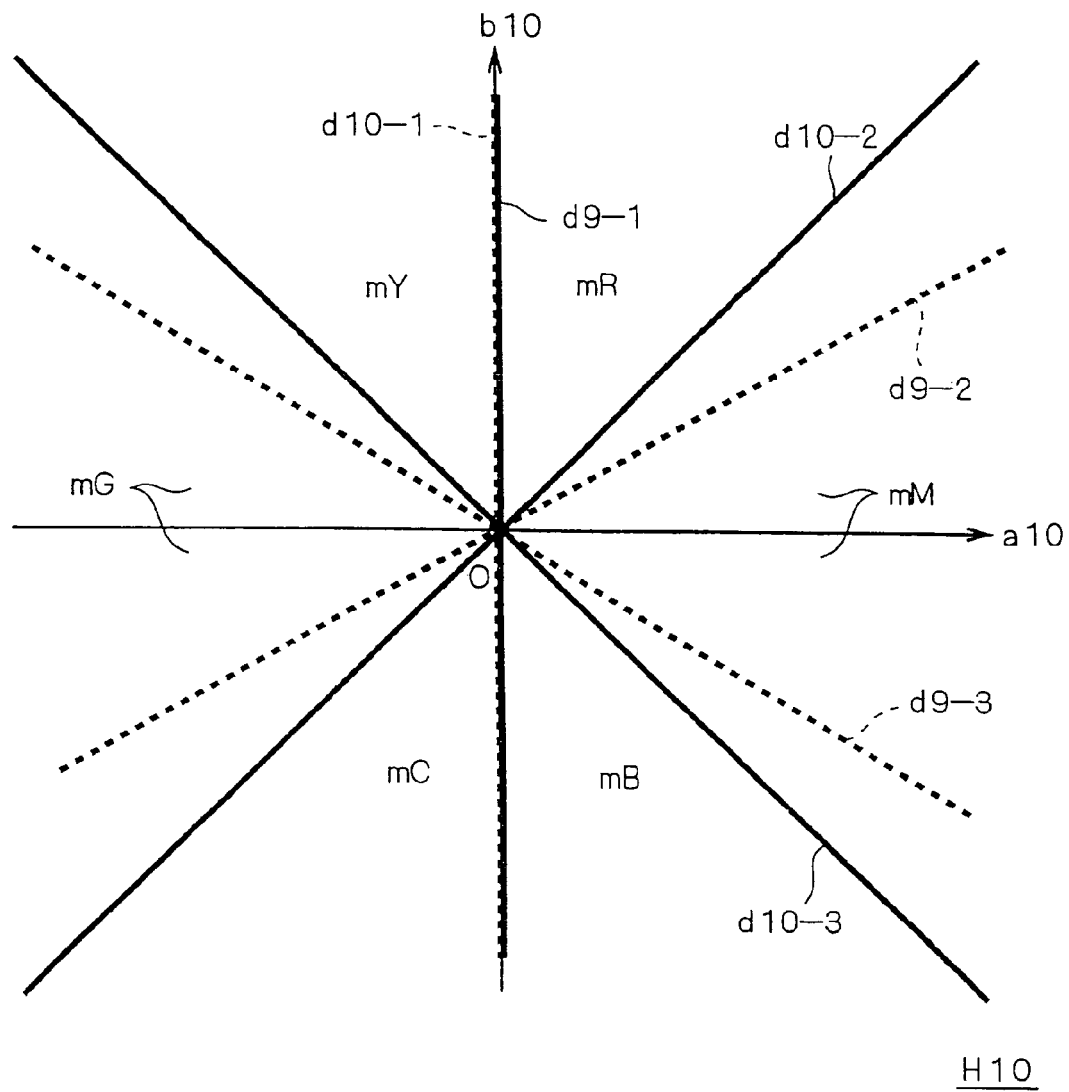
FIG. 14 is a view illustrating a hue plane H10 corresponding to a processing mode 10.

FIG. 14 illustrates an example of a hue plane H10 defined by coordinate axes a10 and b10. In FIG. 14, the color determination boundary lines d9-1 through d9-3 obtained by the processing mode are illustrated by dashed lines for reference. In the processing mode 10, an anisotropic scaling is carried out to enlarge or reduce one of a component of the b10 axis direction and the a10 axis direction. Accordingly, the color determination boundary lines d9-2 and d9-3 are respectively converted into a direction (45 degrees directions) that bisects the a10 axis direction and the b10 axis direction. The color determination boundary lines d9-2 and d9-3 are respectively converted into color determination boundary lines d10-2 and d10-3.

A coefficient k in the anisotropic scaling conversion as a parameter, which defines a direction in which the color determination boundary lines d10-2 and d10-3 extend, is defined by the following method. First, among the color determination boundary lines d9-1 through d9-3 which have been executed with the "rotation coordinate axis matching" and the "aligning", two color determination boundary lines d9-2 and d9-3, which do not match with the coordinate axis, are specified.

For one of the color determination boundary lines d9-2, the coefficient k of the enlarging or the reducing conversion in the anisotropic scaling is defined so that an absolute value of the gradient becomes 1. Accordingly, the color determination boundary line d9-2 is converted into a new color determination boundary line d10-2. For example, when an absolute value of the gradient of the color determination boundary line d9-2 with respect to the a axis (a coordinate axis corresponding to the a10 axis before the conversion) is expressed as an irreducible fraction "A/B" (A and B are different integers), to convert the absolute value of the gradient of the color determination boundary line d9-2 into 1, a scaling coefficient (enlargement ratio) is defined as follows:

$$kx=A$$

$$ky=B$$

[Formula 11]

kx is a scaling coefficient (enlargement ratio) in the direction of the a10 axis (originally the a axis). ky is a scaling coefficient (enlargement ratio) in the direction of the b10 axis (originally the b axis). A reason why the scaling coefficients kx and ky are not a "reduction ratio" is because both A and B are an integer of at least 1 due to a fact that "A/B" is an irreducible fraction.

For the other color determination boundary line d9-3, when the color determination boundary line d9-3 is a line symmetry with the color determination boundary line d9-2 with respect to the b axis, the scaling coefficients kx and ky derived as described above can also be applied to the color determination boundary line d9-3.

In other words, when one of the three color determination boundary lines aligned into straight lines matches with a specific coordinate axis and the remaining two color determination boundary lines do not match with the specific coordinate axis, in case the two color determination boundary lines are not line symmetry with respect to the specific coordinate axis, the two color determination boundary lines are converted to be line symmetry with respect to the specific coordinate axis. Then, by carrying out the anisotropic scaling conversion, each of the two color determination boundary lines can be converted into two straight lines extending in a bisecting direction of the two coordinate axes.

Even when only one color determination boundary line is converted into a straight line extending in the bisecting direction of the two coordinate axes by the anisotropic scaling conversion, a color determination routine can be simplified as described hereinafter for a color region having the one color determination boundary line as a boundary.

The anisotropic scaling does not necessarily require the "aligning" and the "rotation coordinate axis matching". The anisotropic scaling can be carried out independently. In this case, although a symmetric property is not as high as FIG. 14, at least one color determination boundary line can be provided as a straight line extending in the bisecting direction of the two coordinate axes.

In the processing mode 10, by applying the anisotropic scaling coefficient decided as described above also to the image data, an anisotropic scaling is also carried out for the image data. Thus, the processing mode belongs to the mutual adjusting method.

(Determination Processing 10) A determination processing in the hue plane H10 is the same as the determination processing (refer to FIG. 22).

In the determination processing 10, the following relation holds for a coefficient that appears in a formula in the determination processing operation:

Arm=Brm=1

Abm=−Bmb=1 [Formula 12]

A comparison will be made of the determination processing of the determining image data D3, which has been executed with the processing mode 10, and the determination processing of the determining image data D3 before being executed with the processing mode 10. In the determination processing 10, an absolute value of a coefficient of each formula at steps S43-1 through S43-4 is 1. That is, step S43 can be provided as a size comparison of components. Therefore, compared with a case in which an absolute value of the gradient of the color determination boundary line d is not 1, a calculation amount in the region determination can be reduced.

(Processing Mode 10K) The processing mode 10K is used for a color/monochrome determination for determining whether the determining image data is chromatic or achromatic (monochrome). The processing mode 10K rationalizes a saturation boundary line that defines an achromatic region. The processing mode 10K is the boundary adjusting method.

Figure 15:
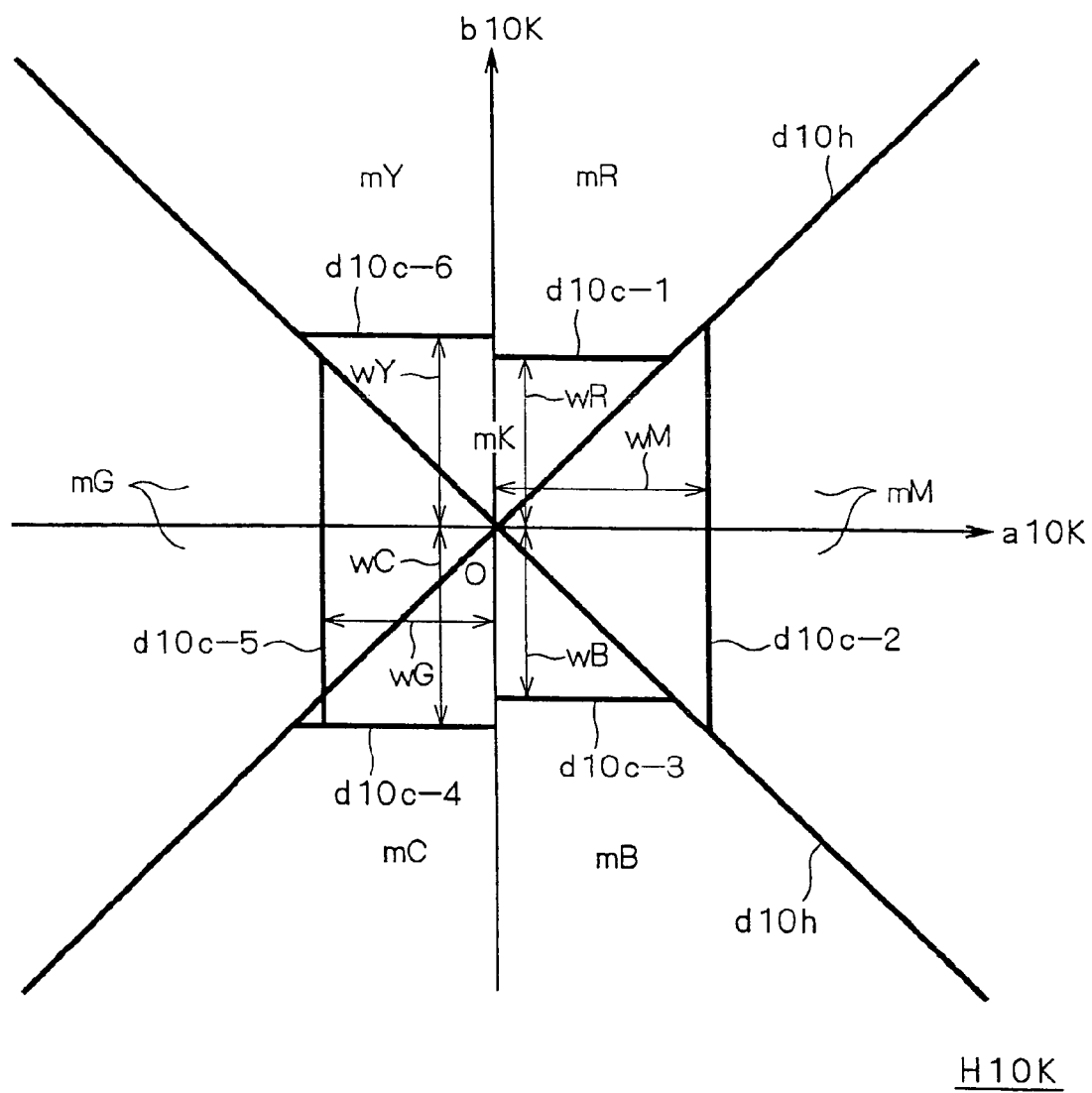
FIG. 15 is a view illustrating a hue plane H10K corresponding to a processing mode 10K.

In a hue plane H10K of FIG. 15, in each hue partial region sectioned by color determination boundary lines d10$h$, color determination boundary lines d10$c$ (d10$c$-1 through d10$c$-6) are arranged. The color determination boundary lines d10$h$ are hue boundary lines. The color determination boundary lines d10$c$ are saturation boundary lines that define a boundary between a color region and a monochrome region. In the example illustrated in FIG. 15, the color determination boundary lines d10$h$ for a hue determination of a chromatic color has been obtained by the processing mode 10. The color determination boundary lines d10$h$ may be obtained from another processing mode and may be the color determination standard boundary line. A region surrounded by the saturation boundary lines d10$c$-1 through d10$c$-6 (a region located at the origin) is the achromatic partial region mK.

The saturation boundary lines d10$c$ are segments parallel to each coordinate axis. Thus, the saturation boundary lines d10$c$ have a rational gradient with respect to each coordinate axis.

By defining the saturation boundary lines d10$c$ for each hue partial region, a size of the achromatic partial region mK can be changed according to the hue. In FIG. 15, the achromatic partial regions continuing to each of the hue partial regions mC through mG are sectioned so that a size of the achromatic partial region mKs are differed from one another.

(Determination Processing 10K) Next, a description will be made of a determination processing 10K in the hue plane H10K.

Figure 23:
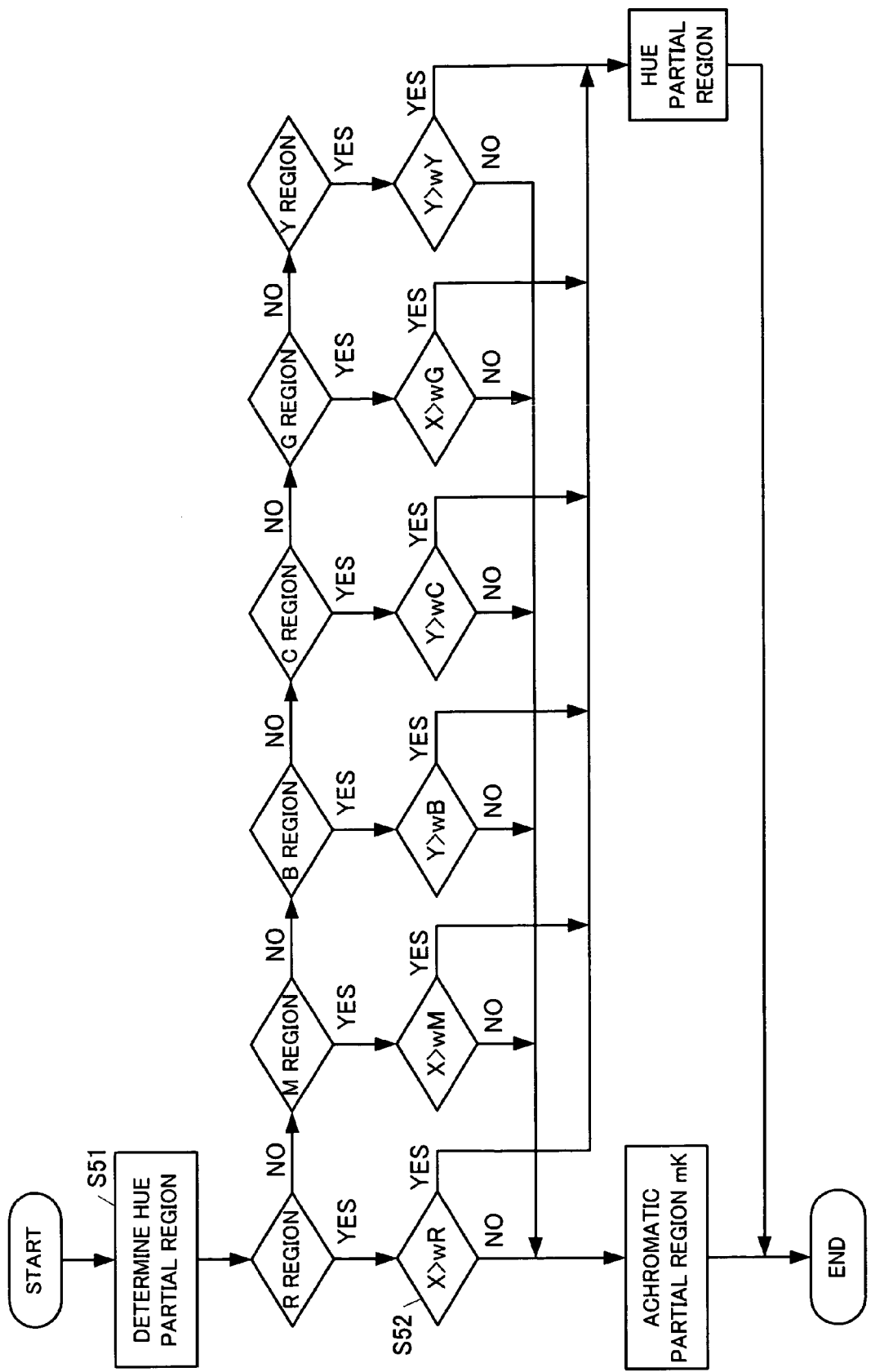
FIG. 23 is a flowchart illustrating a region determination processing operation 10K.

FIG. 23 is a flowchart illustrating the determination processing operation 10K. The unit data is expressed by a coordinate (x, y) in the hue plane H10K.

First, a determination is carried out as to the unit data belongs to which one of the hue partial regions mC through mG (step S51). Further, the determination operation is carried out by the determination processing 10.

Next, a determination is carried out as to whether or not the unit data belongs to the achromatic partial region mK according to a position of the saturation boundary line d10$c$ defined according to each of the hue partial regions mC through mG.

The saturation boundary line d10$c$ is parallel with either one of the coordinate axes. A distance between an origin and the constituent portions d10$c$-1 through d10$c$-6 of each saturation boundary line d10$c$ corresponds to threshold values wC through wG of the region boundary, respectively. Therefore, according to a determination as to the unit data exists in a direction corresponding to which hue partial regions mC through mG, (1) a size of an a10K axis component of the unit data is compared with one of the threshold values wM and wG, or (2) a size of a b10K axis component of the unit data is compared with one of the threshold values wC, mB, mY and mR. Accordingly, when (an absolute value of) the component is smaller than the threshold value of the comparison standard, a determination is made that the unit data belongs to the achromatic partial region mK (step S52).

When the above-described processes of steps S51 and S52 have been completed for all of the unit data, the determination processing ends.

In the processing mode 10K, each component of the saturation boundary line d10$c$ is parallel with either one of the coordinate axes of the hue plane H10. Therefore, the region determination can be carried out by comparing a size of one component among the two coordinate components of the unit data with a prescribed threshold value.

Figure 17:
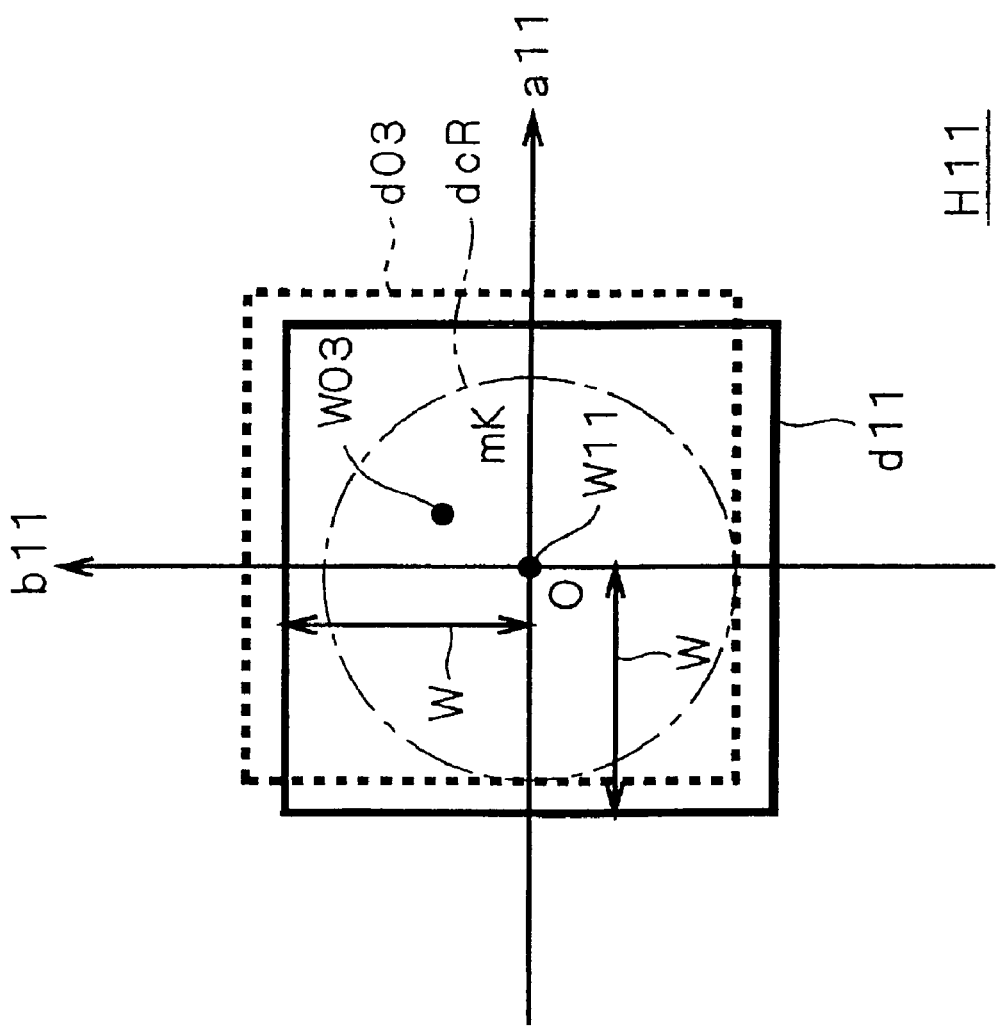
FIG. 17 is a view illustrating a hue plane H11 corresponding to a processing mode 11.

As illustrated in FIG. 17 to be described hereinafter, when a saturation boundary line dcR is adopted, a power calculation such as a quadratic function becomes necessary to be used in the region determination. This is because since the saturation boundary line dcR has a certain saturation value as a threshold value for all directions, the saturation boundary line dcR is described by an equation of a circle. Meanwhile, in the same manner as the color determination boundary lines d10$c$, a saturation boundary line may be handled as a straight line having a rational gradient, particularly, a straight line parallel with a coordinate axis of the hue plane. Accordingly, compared with a case in which a curve like the color determination boundary line dcR or a color determination boundary line having an irrational gradient is used, a calculation amount of the region determination can be reduced.

(Processing Mode 11) The processing mode is a rationalization accompanying a translation of a color determination boundary line of an achromatic region. The processing mode belongs to the mutual adjusting method.

FIG. 16 is a view schematically illustrating the hue determination boundary line d03 defining the achromatic partial region mK in the hue plane H03 of the Lab image data. The color determination boundary line d03 is a saturation boundary line. The achromatic partial region mK is a square including an origin. A geometric center W03 of the square is displaced from the origin.

FIG. 17 illustrates a hue plane H11 obtained by executing the process of the processing mode on the hue plane H03. FIG. 17 illustrates a color determination boundary line d11 on the hue plane H11. In addition, FIG. 17 illustrates the color determination boundary line d03 before the conversion with dotted lines for a purpose of comparison.

The conversion process 11 includes the third conversion processing element, in other words, the translation.

A position of the color determination boundary line d11, that is, parameters p and q in a translation conversion, is defined such that the geometric center W03 of the achromatic partial region mK before the conversion matches with the origin of the hue plane H11 after the conversion.

The image data (unit data) also receives a translation conversion by the parameters p and q. A relative positional relation between the color determination boundary line and the image data does not change. However, a threshold value W defining the position of the color determination boundary line is common in a total of four directions including positive and negative directions of the respective coordinates. As a result, a color/monochrome determination is facilitated.

(Determination Processing 11) Next, a description will be made of a determination processing in the hue plane H11.

Figure 24:
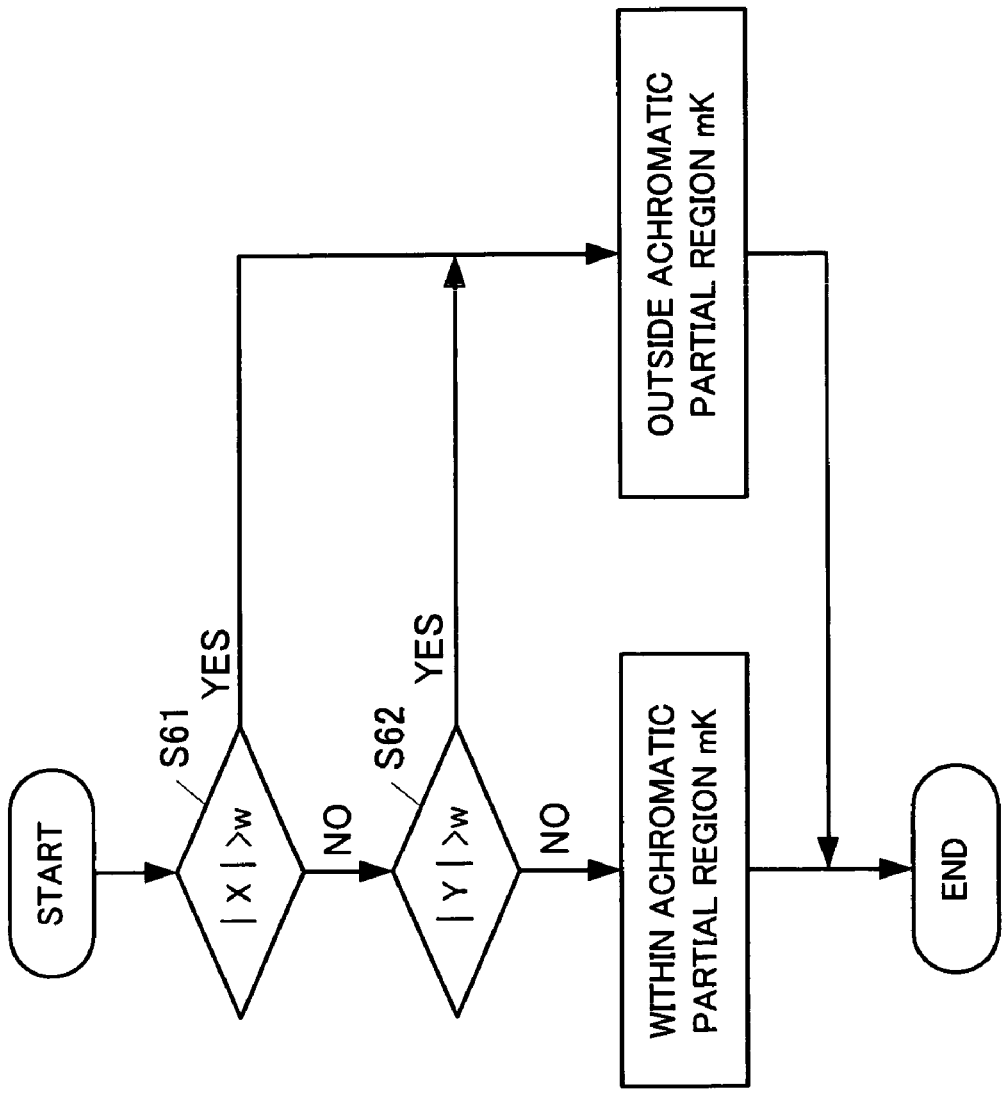
FIG. 24 is a flowchart illustrating a region determination processing operation 11.

FIG. 24 is a flowchart illustrating the determination processing operation of the determining image data D3, which has been executed with the translation conversion in the processing mode 11. The unit data to be determined is expressed by a coordinate (x, y) in the hue plane H11.

First, a determination is carried out as to whether or not a size of an absolute value of x is larger than a prescribed threshold value W (step S61). Next, a determination is carried out as to whether or not a size of an absolute value of y is larger than a size of the prescribed threshold value W (step S62).

That is, when the absolute value of the x and the y components of the unit data are both smaller than the prescribed threshold value W, a determination is made that the unit data belongs to the achromatic partial region mK.

When the processes of steps S61 and S62 have been completed for all unit data, the determination processing ends.

In the color determination boundary line d11, the origin of the hue plane is located at the center of the achromatic partial region mK, that is, a center of a square. Thus, the determination processing can be carried out in two steps. Therefore, compared with a case in which the center of the achromatic partial region mK is not located at the origin, a number of processes in the region determination can be reduced.

When the color determination boundary line d11, which is the saturation boundary line, is set with respect to a prescribed saturation value, the color determination boundary line d11 is arranged as the saturation boundary line dcR in FIG. 17, for example. However, when such a saturation boundary line dcR is defined, a power calculation (a calculation for deriving a sum of a power-of-two of x and a power-of-two of y) becomes necessary to be used in the region determination. Since a geometric shape of the color determination boundary line d11 is a square, a calculation amount of the region determination can be reduced compared with a case of the color determination boundary line dcR.

Further, when the geometric shape of the achromatic partial region mK is a rectangle, although a number of the threshold value increases by one, a similar effect can be obtained from an aspect that a power calculation or the like is unnecessary.

(Processing Mode 11K) The processing mode 11K is an example of rationalizing the color determination boundary line for carrying out the color/monochrome determination and the hue determination.

Figure 18:
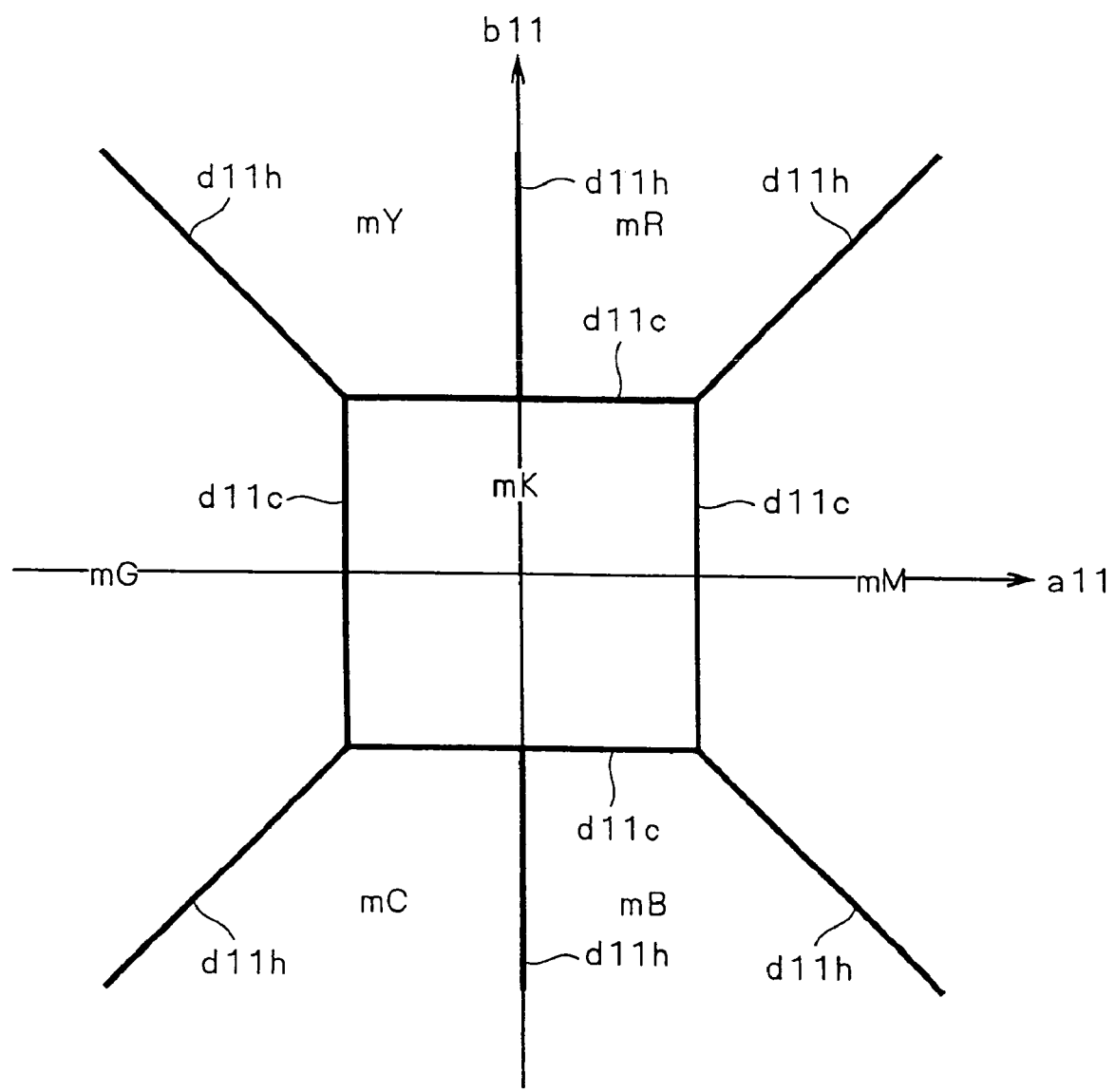
FIG. 18 is a view illustrating a hue plane H11K corresponding to a processing mode 11K.

In an example illustrated in FIG. 18, a color determination boundary line includes hue boundary lines d11h, which define the hue partial regions mC through mG in a hue plane H11K, and saturation boundary lines d11c, which define the achromatic partial region mK.

The hue plane H11K is realized by combining the processing mode illustrated in FIG. 14 for the hue boundary line and the processing mode illustrated in FIG. 17 for the saturation boundary line, for example. The hue plane H11K may be realized by another combination. According to a type of the combination, the hue plane H11K belongs to the boundary adjusting method or the mutual adjusting method.

(Determination Processing 11K) Next, a description will be made of a determination processing 11K in the hue plane H11K.

A region determination processing operation in the determination processing 11K is carried out by both the determination processing and the determination processing 10. First, a determination is carried out as to whether or not the unit data belongs to the achromatic partial region mK (determination processing 11). When a determination is made that unit data does not belong to the achromatic partial region mK, a determination is carried out as to whether or not such unit data belongs to any one of the hue partial regions mC through mG (determination processing 10).

When each of the above-described processes has been completed for all of the unit data, the region determination processing ends.

(5. Color/Monochrome Determination) Next, a description will be made of a case in which a color/monochrome determination is carried out from a determination result of the region determination unit 70. In the determination processing 10K or 11K, the region determination unit 70 carries out a determination as to the unit data belongs to which partial region of the hue plane H10K (FIG. 15) or the hue plane H11K (FIG. 18). Further, in the hue plane H10K, the color determination boundary lines including the hue boundary lines d10h and the saturation boundary lines d10c-1 through d10c-6 are defined. In the hue plane H11K, the color determination boundary lines including the hue boundary lines d11h and the saturation boundary lines d11c are defined. The partial region mentioned here is a generic term of a total of seven regions including the achromatic partial region mK and the six hue partial regions mC through mG.

(5-1. Determination Operation) When the determination processing for all of the unit data has been completed in the region determination unit 70, the counting unit 80 counts a number of unit data belonging to each of the seven partial regions. The number of unit data belonging to each partial region will hereinafter be referred to as an element number n.

The counting unit 80 counts a number of unit data belonging to each partial region. For the achromatic partial region mK, the counting unit 80 counts only unit data having a negative component with respect to the achromatic axis among all of the unit data belonging to the achromatic partial region mK. That is, the counting unit 80 counts only the unit data having a negative sign for a brightness component in the Lab color space or a luminance component in the Ycc color space. This means that the counting unit 80 counts only unit data for black among the unit data belonging to the achromatic partial region mK (a reason is described hereinafter). A determination between a white color and a black color is carried out with a threshold value with respect to the achromatic axis as 0. However, any arbitrary threshold value may be provided.

A prescribed threshold value x is set for each element number n of each partial region. The threshold value x may hold an equal value for all of the partial regions. Alternatively, the threshold value x may hold different values for each partial region. A preferable condition of a set level of the threshold value x is described in detail later.

When the element number n in the hue partial regions mC through mG exceeds the threshold value x in the hue partial region, the counting unit 80 notifies identification information of such a partial region to the color determination unit 90. This notification will hereinafter be referred to as an output signal 1.

When the element number n in the achromatic partial region mK exceeds the threshold value x of the partial region mK, the counting unit 80 notifies such a fact to the color determination unit 90. This notification will hereinafter be referred to as an output signal 2.

When the counting for all of the unit data has been completed, the counting unit 80 notifies an end of the counting to the color determination unit 90. This notification will hereinafter be referred to as an output signal 3. Further, when the counting unit 80 receives a command from the color determination unit 90 to suspend the counting process, the counting unit 80 ends the counting process for all of the unit data. Alternatively, when the counting unit 80 receives a command from the color determination unit 90 to suspend the counting process, even in case the counting for all of the partial regions have not been completed, the counting unit 80 also ends the counting process.

Figure 25:
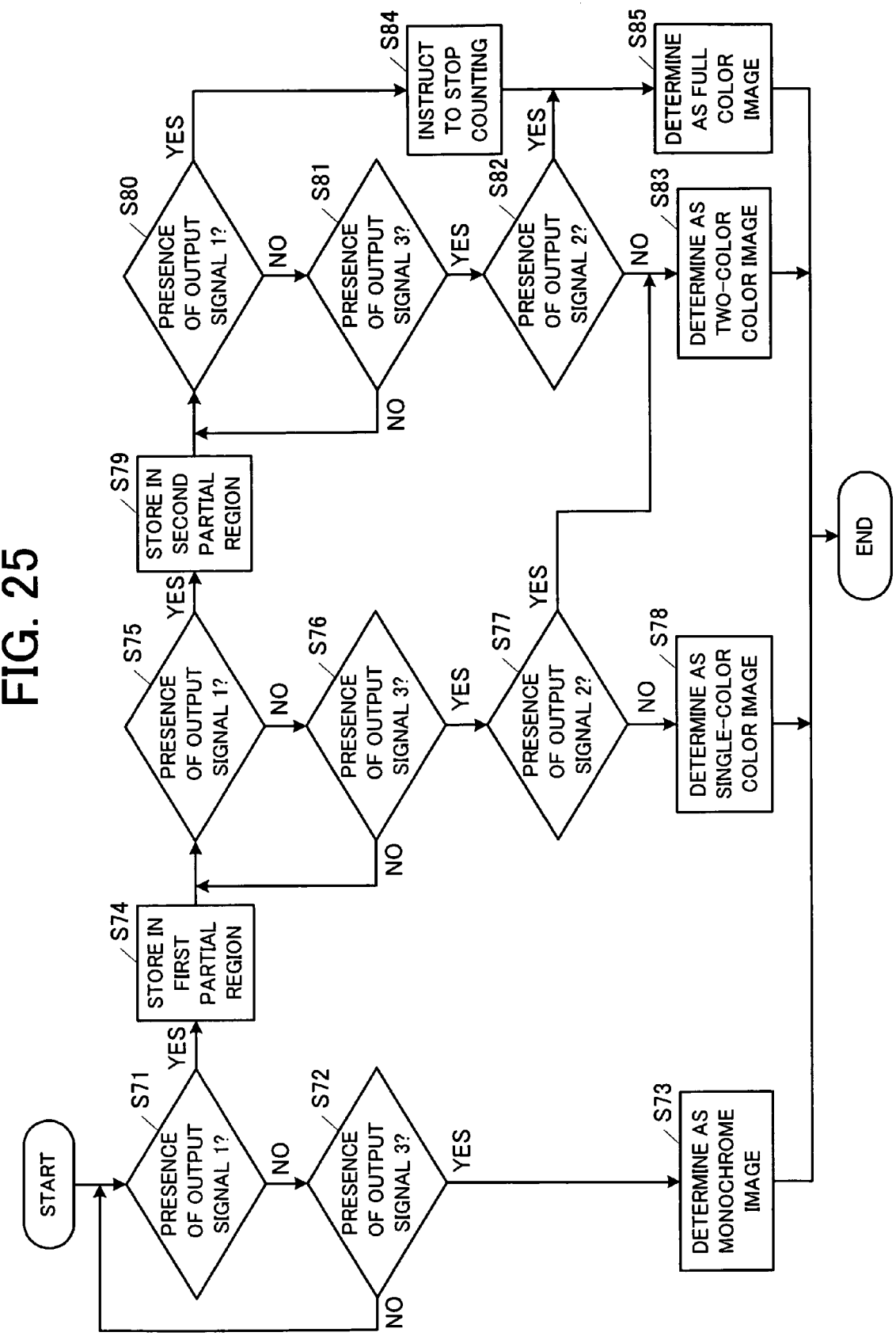
FIG. 25 is a flowchart illustrating a processing operation of a color determination unit.

Next, a description will be made of the determination operation of the color determination unit 90 with reference to the flowchart of FIG. 25.

First, a determination is carried out as to a presence or an absence of the output signal 1 (step S71). That is, a determination is carried out as to a presence or an absence of a partial region in which the element number n exceeds the threshold value x. In case of the absence of the output signal 1, a determination is carried out as to a presence or an absence of the output signal 3 (step S72). That is, a determination is carried out as to whether or not the counting for all of the unit data has been completed. In case of the absence of the output signal 3, that is, in case the counting for all of the unit data has not been completed, the process returns to step S71 again.

Meanwhile, in case of the presence of the output signal 3, that is, in case the counting for all of the unit data has been completed, a determination is made that the determining image data D3 is a monochrome image (step S73). That is, when the element number n does not exceed the threshold value x in all of the six hue partial regions mC through mG excluding the achromatic partial region mK among the seven partial regions to be calculated, a determination is made that the determining image data D3 is a monochrome image.

In case of the presence of the output signal 1 at step S71, an output content of the output signal 1, that is, identification information of the hue partial region exceeding the threshold value x, is stored in the RAM 30 (step S74). The identification information of the hue partial region will hereinafter be referred to as a first partial region.

Furthermore, a determination is carried out as to a presence or an absence of the output signal 1 for a second time (step S75). That is, a determination is carried out as to a presence or an absence of a partial region in which the element number n exceeds the threshold value x, other than the first partial region (step S75).

In case of the absence of the output signal 1 for the second time, a determination is carried out as to a presence or an absence of the output signal 3 (step S76). In case of the absence of the output signal 3, the process returns to step S75.

Meanwhile, in case of the presence of the output signal 3, a determination is carried out as to a presence or an absence of the output signal 2, in other words, whether or not the element number n exceeds the threshold value x in the achromatic partial region mK (step S77).

In case of the absence of the output signal 2, in other words, in case the element number n does not exceed the threshold value x in the achromatic partial region mK, a determination is made that the determining image data D3 is a single-color color image (step S78). That is, when the element number n exceeds the threshold value x in only the first partial region among the seven partial regions to be counted, a determination is made that the determining image data D3 is a single-color color image. A hue of the single-color color is a hue corresponding to the first partial region.

In case of the presence of the output signal 2, in other words, in case the element number n exceeds the threshold value x in the achromatic partial region mK, a determination is made that the determining image data D3 is a two-color color image (step S83). That is, when the element number n exceeds the respective (or common) threshold value x in both the first partial region and the achromatic partial region mK, which are the hue partial regions among the seven partial regions to be calculated, a determination is made that the determining image data D3 is a two-color color image. A hue of the two-color color is a hue corresponding to the first partial region and black.

As described above, the counting unit 80 just counts unit data that belongs to a black color side among the achromatic unit data. The counting unit 80 does not count unit data that belongs to a white color side. This is due to a fact that since a white color component is generally included in a single-color color image using only one chromatic color, if the unit data at the white color side is counted as achromatic color, such a color image may be recognized mistakenly as a monochrome image.

In case of the presence of the output signal 1 for the second time at step S75, in other words, in case of a presence of a second partial region other than the first partial region in which the element number n exceeds the threshold value x, identification information of such a partial region is stored in the RAM 30 (step S79). This hue partial region will hereinafter be referred to as a second partial region.

Next, a determination is carried out as to a presence or an absence of an output signal 1 for a third time (step S80) That is, a determination is carried out as to a presence or an absence of a partial region other than the first and the second partial regions in which the element number n exceeds the threshold value x.

In case of the absence of the output signal 1 for the third time, a determination is carried out as to a presence or an absence of an output signal 3 (step S81). In case of the absence of the output signal 3, the process returns to step S80 again.

Meanwhile, in case of the presence of the output signal 3, a determination is carried out as to a presence or an absence of the output signal 2, in other words, whether or not the element number n in the achromatic partial region mK exceeds the threshold value x (step S82).

In case of the absence of the output signal 2, in other words, in case the element number n in the achromatic partial region mK does not exceed the threshold value x, a determination is made that the determining image data D3 is a two-color color image (step S83). That is, when the element number n exceeds the threshold value x in only the first and the second partial regions among the seven partial regions to be counted, a determination is made that the determining image data D3 is a two-color color image. A hue of the two-color color is a respective hue corresponding to the first partial region and the second partial region.

In case of the presence of the output signal 2, in other words, in case the element number n in the achromatic partial region mK exceeds the threshold value x, a determination is made that the determining image data D3 is a full color image (step S85). That is, when the element number n exceeds the threshold value x in the first partial region, the second partial region and the achromatic partial region mK, which are the hue partial regions among the seven partial regions to be counted, a determination is made that the determining image data D3 is a full color image. An actual hue of the image is the respective hue corresponding to the first partial region and the second partial region, and black. Although there is a case in which the determining image data D3 does not include all three primary colors of YMC, such determining image data D3 is also handled as a full color image.

In case of the presence of the output signal 1 for the third time at step S80, the counting process of the counting unit 80 is suspended (step S84). A determination is made that the determining image data D3 is a full color image (step S85). That is, when the element number n exceeds the threshold value x in at least three partial regions among the seven partial regions to be counted, a determination is made that the determining image data D3 is a full color image.

(5-2. Threshold Value x) Next, a description will be made of a method for setting the threshold value x. The threshold value x is set within a range in which levels in which each color is recognized visually are all detected and a non-visible level which is not recognized visually but appears in data is not detected.

For example, in case of reproducing an original image which includes a red line segment with a width of 1 mm and a length of 2 mm in one portion of a monochrome image, a component number Q1 of the unit data deriving from the red line segment can be calculated from a resolution of the original image and a number of pixels of the unit data.

Therefore, in such determining image data D3, the unit data for the component number Q1 belongs to the red hue partial region and the remaining unit data all belongs to the achromatic partial region mK.

It may be assumed that a user generally determines visually or psychologically that such an image is a monochrome image. Therefore, the threshold value x is preferably set at least the component number Q1. That is, by setting the threshold value x to be at least the component number Q1, a partial region in which the element number n is less than the component number Q1 is not recognized as a print color.

Meanwhile, in case of reproducing an original image which includes a red line segment with a width of 1 mm and a length of 50 mm in one portion of a monochrome image, a component number Q2 of the unit data deriving from the red line segment can also be calculated from a resolution of the original image and a number of pixels of the unit data. In such determining image data D3, the unit data for the component number Q2 belongs to the red hue partial region and the remaining unit data all belongs to the achromatic partial region mK.

For example, such an image is a monochrome original document in which a "red" stamp is sealed by a vermillion ink color in a signature section. It is assumed that the user generally determines such an image as a color image. Therefore, the threshold value x is preferable set at most the component number Q2.

As described above, by setting the threshold value x in accordance with a determination as to the unit data corresponds to which size in a visually observed state, a color/monochrome determination that is not different from a determination made by the user can be carried out. By setting the threshold value x as described above, for example, when a red stamp is sealed on a large-sized monochrome image, in other words, when a percentage of red pixels in the entire pixels is small, a determination can also be made that it is a color image.

The above description relates to the determination operation carried out when the color determination unit 90 carries out the color/monochrome determination.

For example, an operation mode of the image forming unit 5 can be decided in accordance with the color/monochrome determination result of the color determination unit 90.

(5-3. Printing Operation) A description will be made briefly of a printing operation in the image forming unit 5.

Under a full color print mode, a printing operation is carried out by using toner of four colors of YMCK. Under a monochrome print mode, a printing operation is carried out by using toner of only K (black).

Under a single-color color print mode, when a single-color is any one of Y, M and C, a printing operation is carried out by using toner of only one color Y, M or C. The same description applies to a two-color color print mode.

The toners of the digital color MFP 100 are Y, M, C and K. Therefore, when a single color in the single-color color print mode or the two-color color print mode is any one of B, G and R, one color among B, G and R cannot be expressed just by one of the toners of Y, M, C and K. In such a case, a single-color printing operation can be carried out equivalently by carrying out a two-colors combined printing operation using color toners of two colors (i.e., in case of a B-color printing, the toners of M and C are used; in case of a G-color printing, the toners of Y and C are used; and in case of an R-color printing, the toners of Y and M are used). In this case, two color toners among the color toners (Y, M and C) are used. However, all of the three colors of Y, M and C are not used, and laser control modulation signals of the respective two colors applied to a photoconductive drum may be the same. A printed image is visually recognized as one color among B, G and R. Thus, the printing operation carried out in the above case is not a full-color printing operation in which a plurality of colors are distributed spatially. Therefore, also in such a case, a single-color printing operation in a broad term is realized.

A printing operation using only one color toner among the three color toners (Y, M, C) may be the single-color printing operation. When carrying out a printing operation of any one of the colors of R, G and B, the printing operation may be carried out under the full color print mode. When carrying out the printing operation immediately according to the result of the color/monochrome determination, such a mode may be selected. However, when adding the result of the color/monochrome determination to the image data and storing the image data with the result or transmitting the image data with the result to a remote terminal, a device including toners of which combination cannot be specified as a device to be used for a later printing operation. In such a case, a determination of the single color is carried out for not only Y, M and C but for six colors including Y, M, C, R, G and B. Then, information of the determination result may be added to an image data file. As a result, versatility is increased.

An inkjet printer or the like may include an ink of a specific color (for example, flesh color and green) other than Y, M, C and K. When a region corresponding to the specific color ink is specified on a hue plane and an element number belonging to the region is counted, a single-color printing operation using only the specific color ink may be accomplished.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A color determination device, comprising:
a region determining means for determining whether each of image data expressing a color of each portion of a determining image belongs to any one of a plurality of partial regions obtained by dividing a two-dimensional color plane with prescribed color determination boundary lines;
means for counting a region determination result of the region determining means; and
a color determining means for determining a color of the determining image in accordance with a count result of the means for counting;
wherein a gradient of the color determination boundary lines with respect to a coordinate axis of the two-dimensional color plane is a rational number.

2. The color determination device according to claim 1, further comprising a converting means for executing a prescribed conversion including a rotation on the two-dimensional color plane on the image data;
wherein a determination is carried out as to the image data, which has been executed with the prescribed conversion, belongs to which one of the plurality of the partial regions.

3. The color determination device according to claim 2, wherein the prescribed conversion is an affine conversion in the two-dimensional color plane.

4. The color determination device according to claim 2, wherein the prescribed conversion includes a rotation conversion which matches at least one of the color determination boundaries with either one of coordinate axes in the two-dimensional color plane.

5. The color determination device according to claim 2, further comprising a selectively activating means for selectively activating the converting means according to the color of the determining image is expressed by any one of a plurality of types of a three-dimensional color space;
wherein regardless of whether the determining image is expressed by any one of the plurality of types of the three-dimensional color space, a color determination of the image data based on the plurality of the color determination boundary lines can be executed in accordance with a common comparison standard.

6. The color determination device according to claim 2, wherein the prescribed conversion includes an anisotropic scaling in the two-dimensional color plane, and the anisotropic scaling is a conversion in which an absolute value of the gradient with respect to the coordinate axis for at least one of the plurality of the color determination boundary lines is converted into 1.

7. The color determination device according to claim 1, further comprising means for averaging pixel data in a pixel aggregate including adjacent pixels in the determining image and obtaining the image data from the average pixel data.

8. The color determination device according to claim 1, wherein one coordinate axis of a three-dimensional color space expressing the determining image is an achromatic axis.

9. The color determination device according to claim 1, wherein the plurality of the partial regions include an achromatic region corresponding to an achromatic color, and the achromatic region includes an origin of the two-dimensional color plane.

10. The color determination device according to claim 9, wherein the color determining means includes a color/monochrome determining means for determining whether the determining image is a color image or a monochrome image in accordance with a number of data belonging to the achromatic region of the image data.

11. The color determination device according to claim 10, wherein the means for counting includes:
an achromatic color counting means for counting a number of each determining image data belonging to a black color corresponding portion of the achromatic region; and
a chromatic color counting means for counting a number of each image data belonging to each hue region for a plurality of hue regions corresponding to each of a plurality of hues in the plurality of the partial regions;
wherein the color/monochrome determining means includes a color determining means for determining whether the determining image is any one of a full color image, a single-color color image and a two-color color image, in accordance with a count result of each of the achromatic color counting means and the chromatic color counting means.

12. The color determination device according to claim 2, wherein the prescribed conversion includes a translation conversion in the two-dimensional color plane.

13. A color determination method, comprising:
a region determining step of determining as to each of image data expressing a color of each portion of a determining image belongs to which one of a plurality of partial regions obtained by dividing a two-dimensional color plane by prescribed color determination boundary lines;
a counting step of counting a region determination result at the region determining step; and
a color determining step of determining a color of the determining image in accordance with a count result at the counting step;
wherein a gradient of the color determination boundary lines with respect to a coordinate axis of the two-dimensional color plane is a rational number.

14. The color determination method according to claim 13, further comprising a converting step of executing a prescribed conversion including a rotation in the two-dimensional color plane on the image data;
wherein at the region determining step, a determination is carried out as to the image data, which has been executed with the prescribed conversion at the converting step, belongs to which one of the plurality of the partial regions.

15. The color determination method according to claim 14, wherein at the converting step, a rotational conversion, which matches at least one of the color determination boundaries with either one of coordinate axes, is executed on the image data in the two-dimensional color plane.

16. The color determination method according to claim 14, further comprising a selectively activating step of selectively activating a conversion at the converting step according to the color of the determining image is expressed by which one of a plurality of types of a three-dimensional color space;
wherein at the color determining step, regardless of whether the determining image is expressed by any one of the plurality of types of the three-dimensional color space, a color determination of the image data based on the plurality of the color determination boundary lines can be executed in accordance with a common comparison standard.

17. The color determination method according to claim 14, wherein at the converting step, a conversion including an anisotropic scaling in the two-dimensional color plane on the image data; and the anisotropic scaling is a conversion in which an absolute value of the gradient with respect to the coordinate axis for at least one of the plurality of the color determination boundary lines is converted into 1.

18. The color determination method according to claim 13, further comprising an averaging step of averaging pixel data in a pixel aggregate including adjacent pixels in the determining image and obtaining the image data from the averaged pixel data.

19. The color determination method according to claim 13, wherein the plurality of the partial regions include an achromatic region corresponding to an achromatic color and the achromatic region includes an origin of the two-dimensional color plane; and the color determining step includes a color/monochrome determining step of determining whether the determining image is a color image or a monochrome image in accordance with a number of data belonging to the achromatic region of the image data.

20. The color determination method according to claim 19, wherein the counting step includes:

an achromatic color counting step of counting a number of each determining image data belong to a black color corresponding portion of the achromatic region; and a chromatic color counting step of counting a number of each image data belonging to each hue region for a plurality of hue regions corresponding to each of a plurality of hues in the plurality of partial regions;

wherein the color/monochrome determining step includes a color determining step of determining whether the determining image is a full color image, a single-color color image or a two-color color image in accordance with a count result in each of the achromatic color counting step and the chromatic color counting step.

* * * * *